(12) United States Patent
Inoue et al.

(10) Patent No.: US 7,817,081 B2
(45) Date of Patent: Oct. 19, 2010

(54) RADAR APPARATUS, METHOD FOR CONTROLLING THE SAME, AND VEHICLE INCLUDING THE SAME

(75) Inventors: Kenichi Inoue, Osaka (JP); Daisuke Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 144 days.

(21) Appl. No.: 12/207,123

(22) Filed: Sep. 9, 2008

(65) Prior Publication Data
US 2009/0073025 A1    Mar. 19, 2009

(30) Foreign Application Priority Data
Sep. 13, 2007  (JP) .............................. 2007-238358

(51) Int. Cl.
| | |
|---|---|
| G01S 13/00 | (2006.01) |
| G01S 13/58 | (2006.01) |
| G01S 13/08 | (2006.01) |
| H04B 1/00 | (2006.01) |
| H04K 1/10 | (2006.01) |
| H04L 27/10 | (2006.01) |
| H03D 3/00 | (2006.01) |

(52) U.S. Cl. ................... 342/70; 342/112; 342/128; 375/135; 375/136; 375/260; 375/272; 375/334

(58) Field of Classification Search ............... 342/27, 342/28, 70–72, 112, 116, 128–130, 200–204; 375/131–153, 260, 272–278, 303–307, 334–337, 375/367, 346–351
See application file for complete search history.

(56) References Cited

U.S. PATENT DOCUMENTS 4,443,799 A * 4/1984 Rubin ..................... 342/201

(Continued)

FOREIGN PATENT DOCUMENTS

JP    8-262133    4/1996

(Continued)

OTHER PUBLICATIONS

English language Abstract and partial translation of JP 10-27299, Jul. 8, 2006.

(Continued)

*Primary Examiner*—Thomas H Tarcza
*Assistant Examiner*—Peter M Bythrow
(74) *Attorney, Agent, or Firm*—Greenblum & Bernstein P.L.C.

(57) ABSTRACT

Provided is a radar apparatus that detects an object, and includes: an oscillating unit for generating carrier waves; first and second transmission units for spreading the carrier waves, respectively using a first pseudo-random code and a second pseudo-random code different from the first pseudo-random code; a first transmission antenna for transmitting the carrier waves spread by the first transmission unit; a second transmission antenna for transmitting the carrier waves spread by the second transmission unit and have a directional characteristic different from that of the carrier waves transmitted by the first transmission antenna; a reception antenna for receiving reflected waves that are the carrier waves that have been transmitted by the first and second transmission antennas and have been reflected from the object; and a reception unit for despreading the reflected waves, using the first pseudo-random code and despreading the reflected waves, using the second pseudo-random code.

7 Claims, 13 Drawing Sheets

U.S. PATENT DOCUMENTS

| | | | |
|---|---|---|---|
| 5,075,863 A * | 12/1991 | Nagamune et al. | 702/159 |
| 5,291,202 A * | 3/1994 | McClintock | 342/16 |
| RE35,607 E * | 9/1997 | Nagamune et al. | 702/158 |
| 5,717,399 A * | 2/1998 | Urabe et al. | 342/70 |
| 5,719,579 A * | 2/1998 | Torre et al. | 342/13 |
| 5,724,041 A * | 3/1998 | Inoue et al. | 342/70 |
| 5,731,782 A * | 3/1998 | Walls | 342/145 |
| 5,859,870 A * | 1/1999 | Tsujimoto | 375/143 |
| 5,861,834 A * | 1/1999 | Sauer et al. | 342/13 |
| 6,028,548 A * | 2/2000 | Farmer | 342/70 |
| 6,031,485 A * | 2/2000 | Cellai et al. | 342/131 |
| 6,281,786 B1* | 8/2001 | Adachi et al. | 340/435 |
| 6,515,614 B2* | 2/2003 | Sakai et al. | 342/70 |
| 6,822,605 B2* | 11/2004 | Brosche | 342/130 |
| 6,917,327 B2* | 7/2005 | Jenkins | 342/202 |
| 6,940,447 B2* | 9/2005 | Voigtlaender et al. | 342/70 |
| 7,031,496 B2* | 4/2006 | Shimano et al. | 382/104 |
| 7,463,608 B2* | 12/2008 | Bolgiano et al. | 370/335 |
| 7,642,952 B2* | 1/2010 | Fukuda | 342/175 |
| 2002/0067659 A1* | 6/2002 | Becquey | 367/38 |
| 2003/0090405 A1* | 5/2003 | Rauch et al. | 342/21 |
| 2003/0103004 A1* | 6/2003 | Arndt et al. | 342/465 |
| 2006/0036169 A1* | 2/2006 | Satoh | 600/437 |
| 2007/0109175 A1* | 5/2007 | Fukuda | 342/70 |

FOREIGN PATENT DOCUMENTS

JP    10-27299    7/1996

OTHER PUBLICATIONS

English language Abstract and partial translation of JP 8-262133, Apr. 22, 1996.

* cited by examiner

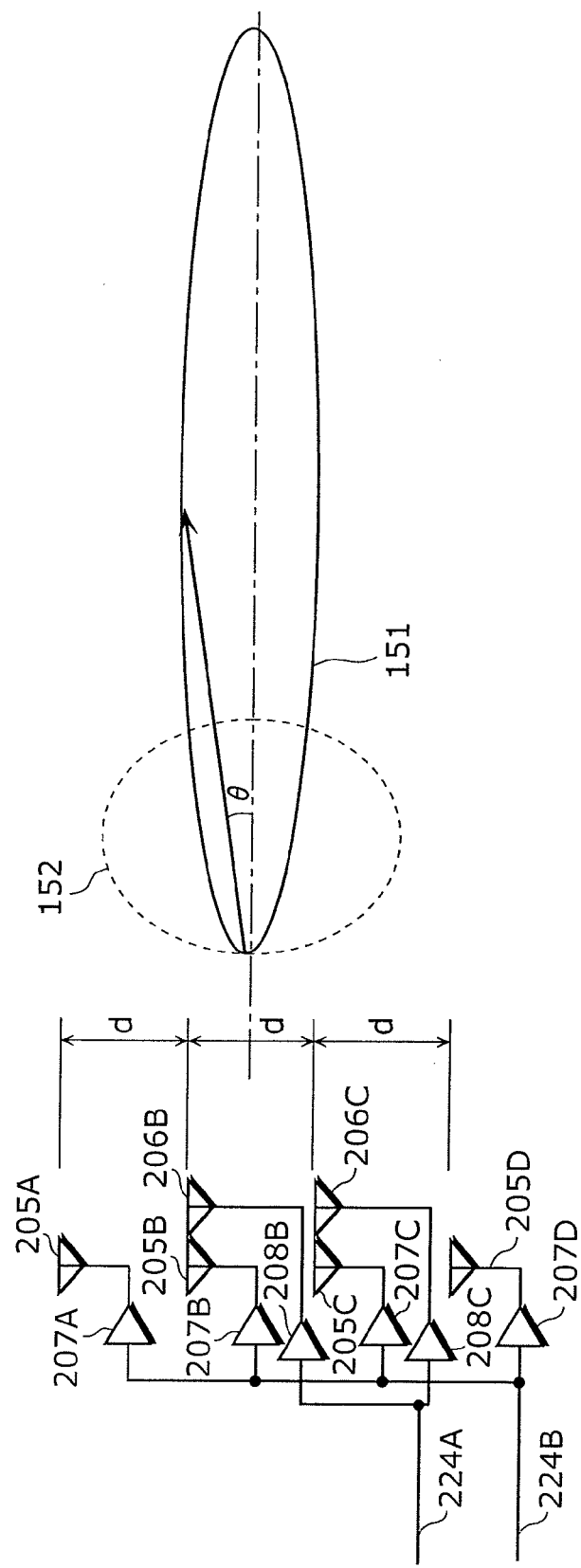

RADAR APPARATUS, METHOD FOR CONTROLLING THE SAME, AND VEHICLE INCLUDING THE SAME

BACKGROUND OF THE INVENTION (1) Field of the Invention

The present invention relates to a radar apparatus, a method for controlling the same, and a vehicle including the same, and more particularly to a radar apparatus that transmits a multiplicity of carrier waves having different directional characteristics, and detects an object.

(2) Description of the Related Art

Vehicles have been equipped with on-vehicle radar apparatuses for preventing collision with other vehicles and detection of obstacles. The on-vehicle radar apparatuses have different detection ranges (detection distances and directions) depending on statuses of the vehicles. For example, while traveling, the on-vehicle radar apparatuses detect an obstacle approximately 100 meters forward. Furthermore, when the vehicles are backing up, the on-vehicle radar apparatuses detect an obstacle in a wider area approximately 10 meters backward of the vehicles.

Furthermore, when the vehicles are traveling, the on-vehicle radar apparatuses need to detect obstacles at different distances and in different directions, depending on a traveling direction of the vehicles. For example, the on-vehicle radar apparatuses need to detect obstacles at a long distance in a straightforward direction. In the case of diagonally forward of the vehicles, the on-vehicle radar apparatuses need to detect not obstacles at a long distance, but obstacles in a wider area with respect to the vehicles.

For such requirements, for example, Japanese Unexamined Patent Application Publication No. 10-27299 (referred to hereinafter as Patent Reference 1) discloses an on-vehicle radar apparatus that emits, straight forward of a vehicle, a beam having a narrower width and that emits, in a diagonally forward direction closer to a side of the vehicle, a beam having a wider width.

FIG. 1 illustrates a block diagram of a conventional on-vehicle radar apparatus described in Patent Reference 1. A radar apparatus 100 illustrated in FIG. 1 includes a distance and speed detecting unit 101, a signal processing unit 102, and a switched mode multi-beam antenna 103.

The multi-beam antenna 103 includes antennas 104, 105, and 106, and a switch 107.

The antenna 104 emits a beam 111 diagonally forward left of a vehicle equipped with the radar apparatus 100. The antenna 105 emits a beam 110 forward of the vehicle. The antenna 106 emits a beam 112 diagonally forward right of the vehicle.

The beam 110 detects an obstacle at a long distance, and has a narrower beam width. The beams 111 and 112 detect an obstacle at a short distance, and have a wider beam width.

The switch 107 switches between the antennas 104, 105, and 106 for emitting a beam.

When the beam emitted from one of the antenna 104, 105, and 106 is reflected from an obstacle, the one of the antenna 104, 105, and 106 that has emitted the beam receives the reflected beam.

The signal processing unit 102 performs signal processing, such as analog-digital conversion, on the beam received by the one of the antenna 104, 105, and 106. The distance and speed detecting unit 101 detects, based on a signal obtained through the signal processing by the signal processing unit 102, a distance from the vehicle equipped with the radar apparatus 100 to the obstacle, a relative speed with respect to the obstacle, and other information.

With such a configuration, the conventional radar apparatus 100 can switch between detection ranges by switching between the antennas 104, 105, and 106 using the switch 107.

Furthermore, for example, Japanese Unexamined Patent Application Publication No. 8-262133 (referred to hereinafter as Patent Reference 2) discloses a radar apparatus that switches between radio waves emitted from an antenna in a time-sharing mode. The radar apparatus disclosed in Patent Reference 2 is an FM radar apparatus, and transmits FM signals having a predetermined level, from antennas at different times. The radar apparatus switches between the FM signals using a switch.

However, both of the conventional radar apparatuses disclosed in Patent References 1 and 2 need to select, using a certain switch (for example, an electronic switching device), one of transmission antennas, or the transmission antennas alternately in a time-sharing mode in order to switch between detection distances and detection directions of the vehicle equipped with one of the radar apparatuses. Furthermore, some on-vehicle radar apparatuses use pulses or carrier waves having millimeter or quasi millimeter wave frequencies. In other words, switching devices need to be interposed in transmission paths having a high frequency up to several tens of GHz. Thus, the conventional radar apparatuses need to be controlled without any influence of reflection, loss, and change of waves with the passage of time in such transmission paths. In other words, there is a problem that designing of the conventional radar apparatuses has difficulty due to necessity of switching devices.

In general, a GaAs PIN diode and others are used as such switching devices. Costly switching devices further increase the cost of radar apparatuses. In other words, the conventional radar apparatuses including such switching devices have a problem of increased costs.

SUMMARY OF THE INVENTION

In view of the problems described above, the present invention has an object of providing a radar apparatus capable of changing detection distances and detection directions of a vehicle, a method for controlling the same, and a vehicle including the same, without providing any switching device in a transmission path of carrier waves.

In order to achieve the object, the radar apparatus according to the present invention detects an object, and includes: an oscillating unit configured to generate carrier waves; a first transmission unit configured to spread the carrier waves generated by the oscillating unit, using a first pseudo-random code; a second transmission unit configured to spread the carrier waves generated by the oscillating unit, using a second pseudo-random code different from the first pseudo-random code; a first transmission antenna that transmits first carrier waves that are the carrier waves spread by the first transmission unit; a second transmission antenna that transmits second carrier waves that are the carrier waves spread by the second transmission unit, the second carrier waves having a directional characteristic being different from a directional characteristic of the first carrier waves transmitted by the first transmission antenna; a reception antenna that receives reflected waves that are the first carrier waves and the second carrier waves that have been transmitted respectively by the first transmission antenna and the second transmission antenna and have been reflected from the object; and a reception unit configured to despread the reflected waves received by the reception antenna, using the first pseudo-random code and to despread the reflected waves received by the reception antenna, using the second pseudo-random code.

With this configuration, the radar apparatus according to the present invention transmits carrier waves that have different directional characteristics and that have been spread using different pseudo-random codes. Furthermore, the radar apparatus according to the present invention despreads the first and second carrier waves that are reflected from an object, using 2 pseudo-random codes, respectively. Thereby, the carrier waves having different directional characteristics can be extracted separately and equivalently. Thus, the radar apparatus can switch between two different detectable areas with detection distances and directions of a vehicle without interposing a switching device in a transmission path of carrier wave of several tens of GHz.

Furthermore, the first carrier waves transmitted by the first transmission antenna may cover a range of a longer distance and a narrower angle than a range of the second carrier waves transmitted by the second transmission antenna.

With this configuration, the radar apparatus according to the present invention can detect an object by switching between a detection range of a longer distance and a narrower angle and a detection range of a shorter distance and a wider angle.

Furthermore, the first transmission antenna may include third transmission antennas, the second transmission antenna may include fourth transmission antennas that are less than the third transmission antennas in number, the third transmission antennas and the fourth transmission antennas may be respectively disposed linearly in a first direction; and the third transmission antennas and the fourth transmission antennas may be respectively disposed symmetric with respect to a second direction perpendicular to the first direction. With this configuration, the radar apparatus according to the present invention can detect a range symmetric with respect to a vehicle, forward and diagonally forward of the vehicle.

Furthermore, each of the fourth transmission antennas may be disposed to be paired with the third transmission antennas; and in the first direction, (i) the pairs of the third transmission antennas and the fourth transmission antennas may be sandwiched between the other of the third transmission antennas that are not paired with the fourth transmission antennas, or (ii) the third transmission antennas that are not paired with the fourth transmission antennas may be sandwiched between the pairs of the fourth transmission antennas and the other of the third transmission antennas.

With this configuration, since the third transmission antennas are larger in number than the fourth transmission antennas, the first carrier waves transmitted by the first transmission antenna can have a range of a longer distance and a narrower angle. In other words, the radar apparatus according to the present invention can detect an object by switching between a detection range of a longer distance and a narrower angle and a detection range of a shorter distance and a wider angle.

Furthermore, the third transmission antennas are disposed to be paired with the fourth transmission antennas, and the pairs of the third transmission antennas and the fourth transmission antennas are disposed symmetric linearly inward or outward of the pairs of third transmission antennas and the fourth transmission antennas. Thereby, the third transmission antennas and the fourth transmission antennas can be designed each as a linear array antenna while maintaining a symmetrical property of a detection range with respect to right and left directions of the vehicle.

Furthermore, the radar apparatus may further include a gain adjusting unit configured to adjust a gain of the first carrier waves transmitted by the first transmission antenna to be larger than a gain of the second carrier waves transmitted by the second transmission antenna.

With this configuration, the gain adjusting unit can easily set ranges of the first and second carrier waves transmitted by the first transmission antenna and the second transmission antenna, respectively. For example, a range of the first carrier waves transmitted from the first transmission antenna can be easily expanded to a longer distance by increasing electric power of the carrier waves transmitted from the first transmission antenna more than that of the second carrier waves transmitted from the second transmission antenna.

Furthermore, the reception unit may include: a first selecting unit configured to select one of the first pseudo-random code and the second pseudo-random code; a despreading unit configured to despread, using one of the first pseudo-random code and the second pseudo-random code selected by the first selecting unit, the reflected waves received by the reception antenna; and a detecting unit configured to detect the reflected waves despread by the despreading unit, using the carrier waves generated by the oscillating unit.

With this configuration, one despreading unit and one detecting unit can despread and detect waves using selectively 2 pseudo-random codes, because the first selecting unit selects a pseudo-random code to be used for despreading. Thus, a circuit area in a reception unit can be reduced.

Furthermore, the reception unit may include: a splitting unit configured to split the reflected waves received by the reception antenna into first reflected waves and second reflected waves; a first despreading unit configured to despread the first reflected waves using the first pseudo-random code; a first detecting unit configured to detect the first reflected waves despread by the first despreading unit, using the carrier waves generated by the oscillating unit; a second despreading unit configured to despread the second reflected waves, using the second pseudo-random code; and a second detecting unit configured to detect the second reflected waves despread by the second despreading unit, using the carrier waves generated by the oscillating unit.

With this configuration, waves can be despread and detected in parallel using different pseudo-random codes. Thus, the processing speed of the reception circuit can be improved.

Furthermore, the reception antenna may include a first reception antenna and a second reception antenna, and the reception unit may include: a first despreading unit configured to despread reflected waves received by the first reception antenna, using the first pseudo-random code; a first detecting unit configured to detect the reflected waves despread by the first despreading unit, using the carrier waves generated by the oscillating unit; a second despreading unit configured to despread reflected waves received by the second reception antenna, using the second pseudo-random code; and a second detecting unit configured to detect the reflected waves despread by the second despreading unit, using the carrier waves generated by the oscillating unit.

With this configuration, waves can be despread and detected in parallel using different pseudo-random codes. Thus, the processing speed of the reception circuit can be improved.

Furthermore, the radar apparatus may further include: a code generating unit configured to generate a third pseudo-random code, a fourth pseudo-random code, and a fifth pseudo-random code; a first OR circuit that generates the first pseudo-random code by calculating an exclusive OR of the third and fourth pseudo-random codes; and a second OR circuit that generates the second pseudo-random code by calculating an exclusive OR of the third and fifth pseudo-random codes.

With this configuration, the carrier waves can be spread using gold-sequence pseudo-random codes. Thus, various pseudo-random codes can be used easily.

Furthermore, the reception unit may include: a first despreading unit; a second despreading unit; a third despreading unit; and a second selecting unit configured to assign the third, fourth, and fifth pseudo-random codes to the first despreading unit, the second despreading unit, and the third despreading unit, wherein the first despreading unit may be configured to despread the reflected waves received by the reception antenna, using one of the third, fourth, and fifth pseudo-random codes assigned by the second selecting unit, the second despreading unit may be configured to despread the reflected waves received by the reception antenna, using one of the third, fourth, and fifth pseudo-random codes assigned by the second selecting unit, the third despreading unit may be configured to despread the reflected waves despread by the first despreading unit and the reflected waves despread by the second despreading unit, using one of the third, fourth, and fifth pseudo-random codes assigned by the second selecting unit, and the reception unit may include a detecting unit configured to detect the reflected waves despread by the third despreading unit, using the carrier waves generated by the oscillating unit.

With this configuration, one of the carrier waves spread by any pseudo-random code obtained through an exclusive OR of 2 pseudo-random codes can be selectively extracted.

Furthermore, the vehicle according to the present invention includes a radar apparatus that detects an object, wherein the radar apparatus includes: an oscillating unit configured to generate carrier waves; a first transmission unit configured to spread the carrier waves generated by the oscillating unit, using a first pseudo-random code; a second transmission unit configured to spread the carrier waves generated by the oscillating unit, using a second pseudo-random code different from the first pseudo-random code; a first transmission antenna that transmits first carrier waves that are the carrier waves spread by the first transmission unit; a second transmission antenna that transmits second carrier waves that are the carrier waves spread by the second transmission unit, the second carrier waves having a directional characteristic being different from a directional characteristic of the first carrier waves transmitted by the first transmission antenna; a reception antenna that receives reflected waves that are the first carrier waves and the second carrier waves that have been transmitted respectively by the first transmission antenna and the second transmission antenna and have been reflected from the object; and a reception unit configured to despread the reflected waves received by the reception antenna, using the first pseudo-random code and to despread the reflected waves received by the reception antenna, using the second pseudo-random code, the first transmission antenna transmits the first carrier waves spread by the first transmission unit, forward of the vehicle, and the second transmission antenna transmits the second carrier waves spread by the second transmission unit, at least forward or diagonally forward of the vehicle.

With this configuration, the vehicle apparatus according to the present invention transmits carrier waves that have different directional characteristics and that have been spread using different pseudo-random codes. Furthermore, the vehicle according to the present invention despreads the carrier waves reflected from an object, using 2 pseudo-random codes, respectively. Thereby, the carrier wave having different directional characteristics can be extracted separately and equivalently. Thus, the vehicle according to the present invention can switch between two different detection distances and directions of a vehicle without interposing a switching device in a transmission path of carrier wave of several tens of GHz. Furthermore, the vehicle according to the present invention can detect an object by switching between a detection range of a longer distance and a narrower angle with respect to a front direction of the vehicle and a detection range of a shorter distance and a wider angle with respect to an oblique forward direction of the vehicle.

A method for controlling a radar apparatus according to the present invention is a method for controlling a radar apparatus that detects an object, and includes: generating carrier waves; spreading the carrier waves using a first pseudo-random code, and spreading the carrier waves using a second pseudo-random code different from the first pseudo-random code; transmitting first carrier waves and second carrier waves, the first carrier waves being the carrier waves spread using the first pseudo-random code, and the second carrier waves being the carrier waves spread using the second pseudo-random code and having a directional characteristic different from a directional characteristic of the first carrier waves; receiving reflected waves that are the first carrier waves and the second carrier waves and that have been transmitted and have been reflected from the object; and despreading the reflected waves using the first pseudo-random code, and the reflected waves using the second pseudo-random code.

With the controlling method, carrier waves that have different directional characteristics and that have been spread using different pseudo-random codes are transmitted. Furthermore, with the controlling method, the first and second carrier waves reflected from an object are despread, using 2 pseudo-random codes, respectively. Thereby, the first and second carrier waves having different directional characteristics can be extracted separately and equivalently. Thus, the controlling method according to the present invention can switch between detection distances and directions of a vehicle without interposing a switching device in a transmission path of carrier wave of several tens of GHz.

As described above, the present invention can provide a radar apparatus capable of changing detection ranges and detection directions, a method for controlling the same, and a vehicle including the same, without providing a switching device in a transmission path of carrier waves.

FURTHER INFORMATION ABOUT TECHNICAL BACKGROUND TO THIS APPLICATION

The disclosure of Japanese Patent Application No. 2007-238358 filed on Sep. 13, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 schematically illustrates disposition of transmission antennas and emission patterns of beams according to the first embodiment;

DESCRIPTION OF THE PREFERRED EMBODIMENTS

The following describes a radar apparatus according to embodiments of the present invention with reference to drawings.

First Embodiment

The radar apparatus according to a first embodiment of the present invention spreads carrier waves to be transmitted so as to cover different ranges using different pseudo-random codes. Furthermore, the radar apparatus despreads carrier waves to be reflected from an object using different pseudo-random codes. Thereby, the radar apparatus can extract the multiplexed carrier waves individually, thus enabling switching between detection ranges without providing any switching device in a transmission path of the carrier waves.

First, a configuration of the radar apparatus according to the first embodiment is described.

Figure 1:
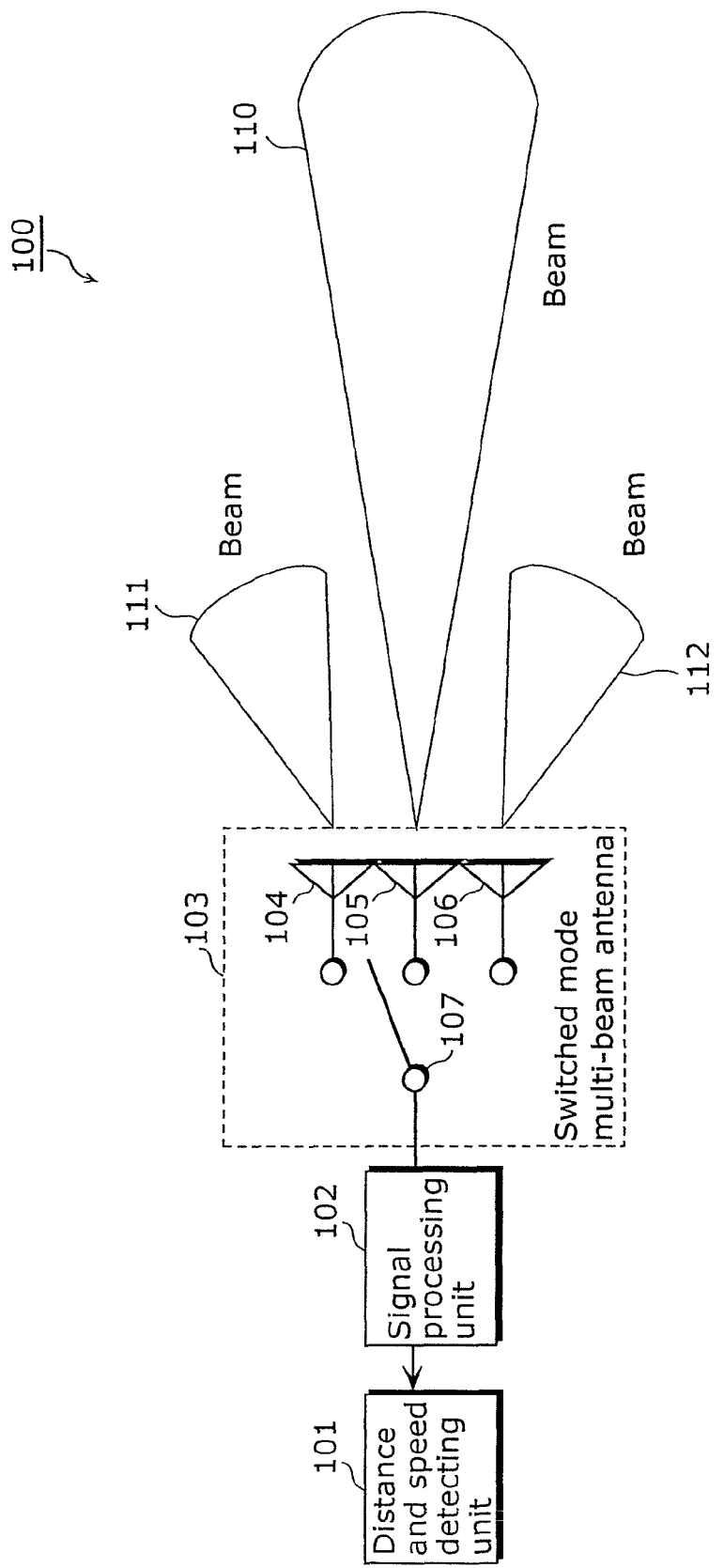
FIG. 1 illustrates a block diagram of a conventional radar apparatus.
Figure 2:
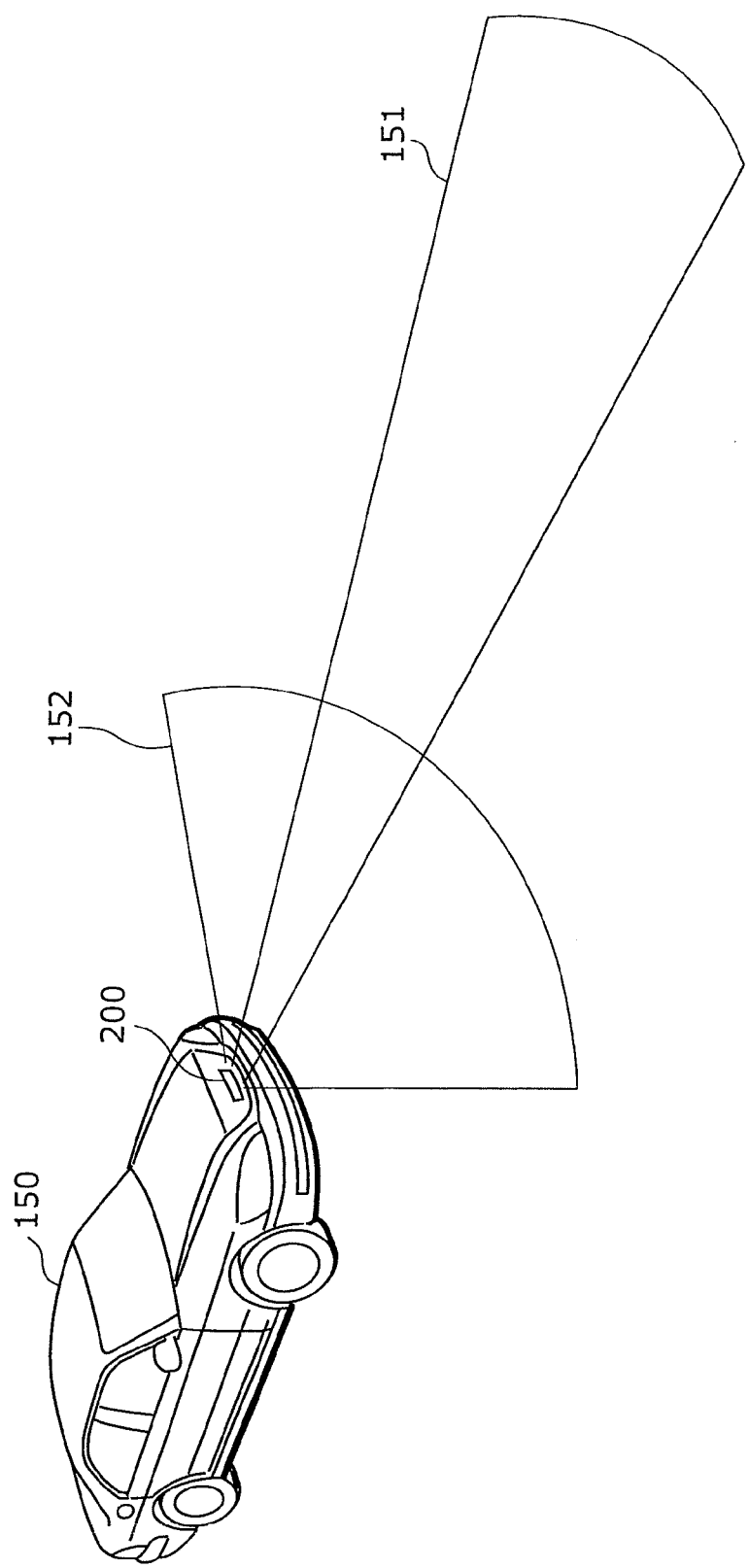
FIG. 2 schematically illustrates an external view of a vehicle equipped with the radar apparatus according to the first embodiment.

FIG. 2 schematically illustrates an external view of a vehicle equipped with the radar apparatus according to the first embodiment. A vehicle 150 in FIG. 2 includes a radar apparatus 200 that is mounted in a front side of the vehicle 150. The radar apparatus 200 is a radar apparatus that detects objects in 2 detection ranges. The radar apparatus 200 emits a beam 151 forward of the vehicle 150, and emits a beam 152 forward and diagonally forward of the vehicle 150. The beam 151 is emitted to a longer distance and at a narrower angle than the beam 152.

Furthermore, the radar apparatus 200 detects an obstacle forward of the vehicle 150 by reflection or scattering from objects by the beams 151 and 152.

Figure 3:
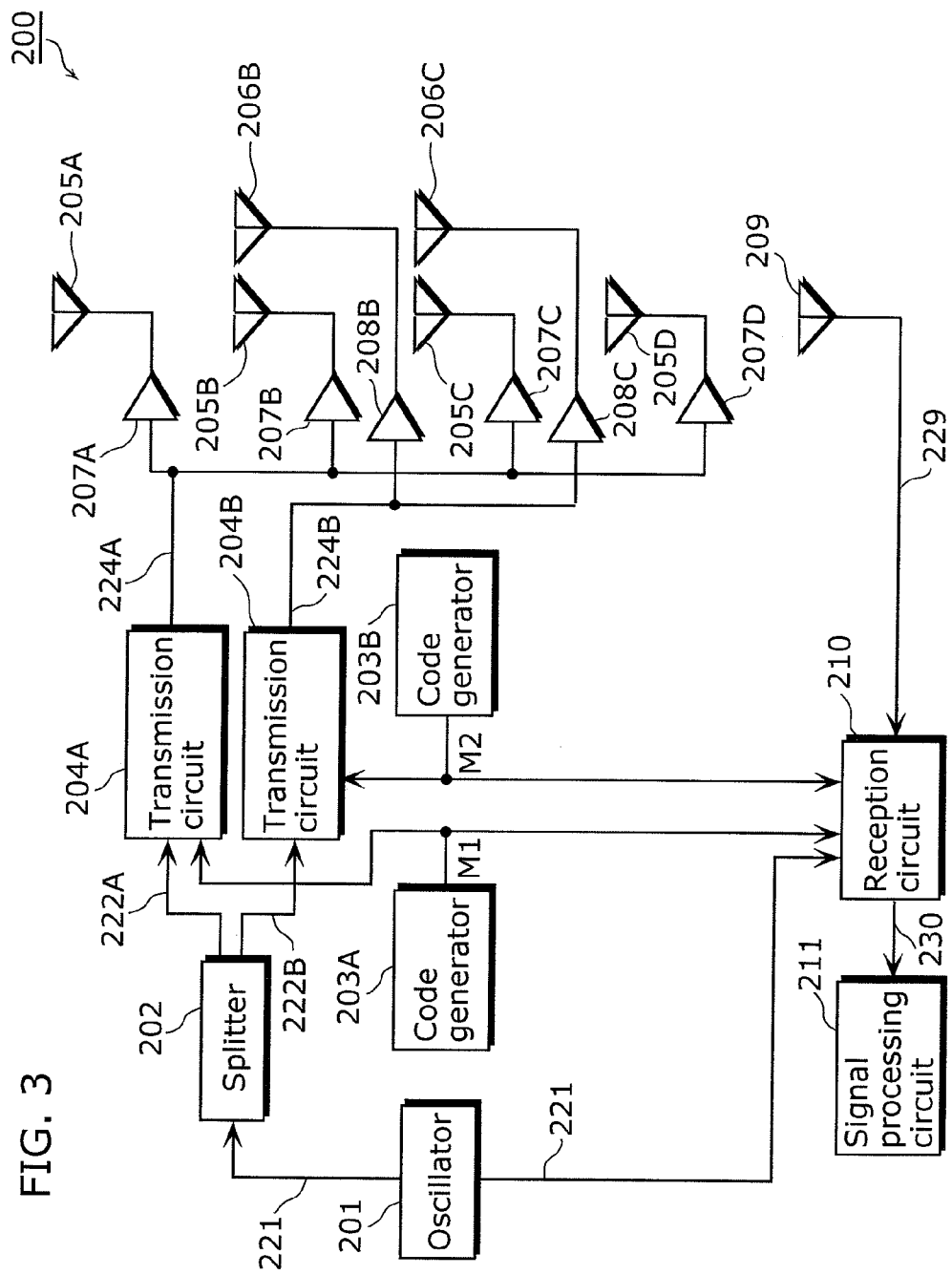
FIG. 3 illustrates a block diagram of a configuration of the radar apparatus according to the first embodiment.

FIG. 3 illustrates a block diagram of the configuration of the radar apparatus 200.

The radar apparatus 200 includes an oscillator 201, a splitter 202, code generators 203A and 203B, transmission circuits 204A and 204B, transmission antennas 205A, 205B, 205C, 205D, 206B, and 206C, gain adjustment circuits 207A, 207B, 207C, 207D, 208B, and 208C, a reception antenna 209, a reception circuit 210, and a signal processing circuit 211. When the antennas do not have to be distinguished individually: the transmission antennas 205A, 205B, 205C, and 205D are collectively referred to as a transmission antenna 205; the transmission antennas 206B and 206C are collectively referred to as a transmission antenna 206; the gain adjustment circuits 207A, 207B, 207C, and 207D are collectively referred to as a gain adjustment circuit 207; and the gain adjustment circuits 208B and 208C are collectively referred to as a gain adjustment circuit 208.

The oscillator 201 generates carrier waves 221 at quasi millimeter wave frequencies ranging from 20 to 30 GHz (for example, 26 GHz band) or carrier waves 221 at millimeter wave frequencies ranging from 30 to 100 GHz (for example, 60 or 76 GHz band).

The oscillator 201 may directly generate the carrier waves having the above-mentioned frequencies, or oscillate in a frequency lower than the frequencies and then generate the carrier waves having the above-mentioned frequencies using a multiplier. When the frequency of the carrier waves 221 is 26.4 GHz, an oscillation frequency of the oscillator 201 may be set to 26.4 GHz. Alternatively, the oscillator 201 may generate carrier waves having the frequency of 26.4 GHz by setting oscillation frequency of the oscillator 201 to 8.8 GHz and by tripling frequency of a signal oscillated by the oscillator 201 through a multiplier. Here, the oscillator 201 includes the multiplier. Furthermore, both of the two cases for generating carrier waves indicate that the oscillator 201 outputs carrier waves having the frequency of 26.4 GHz.

The splitter 202 generates the same carrier waves 222A and 222B by splitting the carrier waves 221.

The code generator 203A generates a pseudo-random code M1 (hereinafter referred to as a "code M1"). The code generator 203B generates a pseudo-random code M2 (hereinafter referred to as a "code M2"). The codes M1 and M2 are different pseudo-random codes. In the first embodiment, the codes M1 and M2 are PN codes each having a different pattern, and more specifically, are M-sequence codes. Furthermore, the codes M1 and M2 are preferably M-sequence codes having a low correlation therebetween. Here, the code generators 203A and 203B may be integrated into a code generator, and the resulting code generator may simultaneously generate different codes, and output the codes.

The transmission circuit 204A spreads the carrier waves 222A using the code M1, and generates spread waves 224A. The transmission circuit 204B spreads the carrier waves 222B using the code M2, and generates spread waves 224B.

The gain adjustment circuit 207 amplifies the spread waves 224A. The gain adjustment circuit 208 attenuates the spread waves 224B. More specifically, the gain adjustment circuits 207 and 208 set electric field intensity of the spread waves 224A to be transmitted from the transmission antennas 205 to be approximately 10 times higher than that of the spread waves 224B to be transmitted from the transmission antenna 206.

The transmission antenna 205 transmits the beam 151 by transmitting the spread waves 224A amplified by the gain adjustment circuit 207. The transmission antenna 206 transmits the beam 152 by transmitting the spread waves 224B attenuated by the gain adjustment circuit 208. Furthermore, the beam 151 emitted through the transmission antenna 205 and the beam 152 emitted through the transmission antenna 206 are emitted as beams having different directional characteristics, respectively. More specifically, the beam 151 emitted through the transmission antenna 205 covers a range of a longer distance and a narrower angle than that of the beam 152 emitted through the transmission antenna 206.

The reception antenna 209 receives reflected waves 229 obtained by reflection from objects with the beams 151 and 152 that have been respectively emitted by the transmission antennas 205 and 206.

The reception circuit 210 despreads the reflected waves 229 using the code M1, and performs quadrature detection (demodulation) on a signal corresponding to the despread reflected waves 229 to generate a baseband radar signal 230. In other words, the reception circuit 210 extracts reflected waves obtained by reflection from objects with the beam 151, and generates the baseband radar signal 230 corresponding to the reflected waves. Here, a baseband radar signal corresponds to reflected waves downconverted to a low frequency band. The signal components are included in a reception signal according to variations of intensity of electric waves emitted from a radar apparatus and reflected from an object. Furthermore, the reception circuit 210 despreads the reflected waves 229 using the code M2, and performs quadrature detection (demodulation) on a signal corresponding to the despread reflected waves 229 to generate the baseband radar signal 230. In other words, the reception circuit 210 extracts reflected waves obtained by reflection from objects with the beam 152, and generates the baseband radar signal 230 corresponding to the reflected waves.

The signal processing circuit 211 decides, for example, a distance from the vehicle 150 to an object, and a relative speed with respect to the object by performing signal processing on the baseband radar signal 230. Here, the signal processing circuit 211 may perform the signal processing using a general radio device, and thus the detailed description is omitted.

Next, a detailed configuration of the reception circuit 210 is described.

Figure 4:
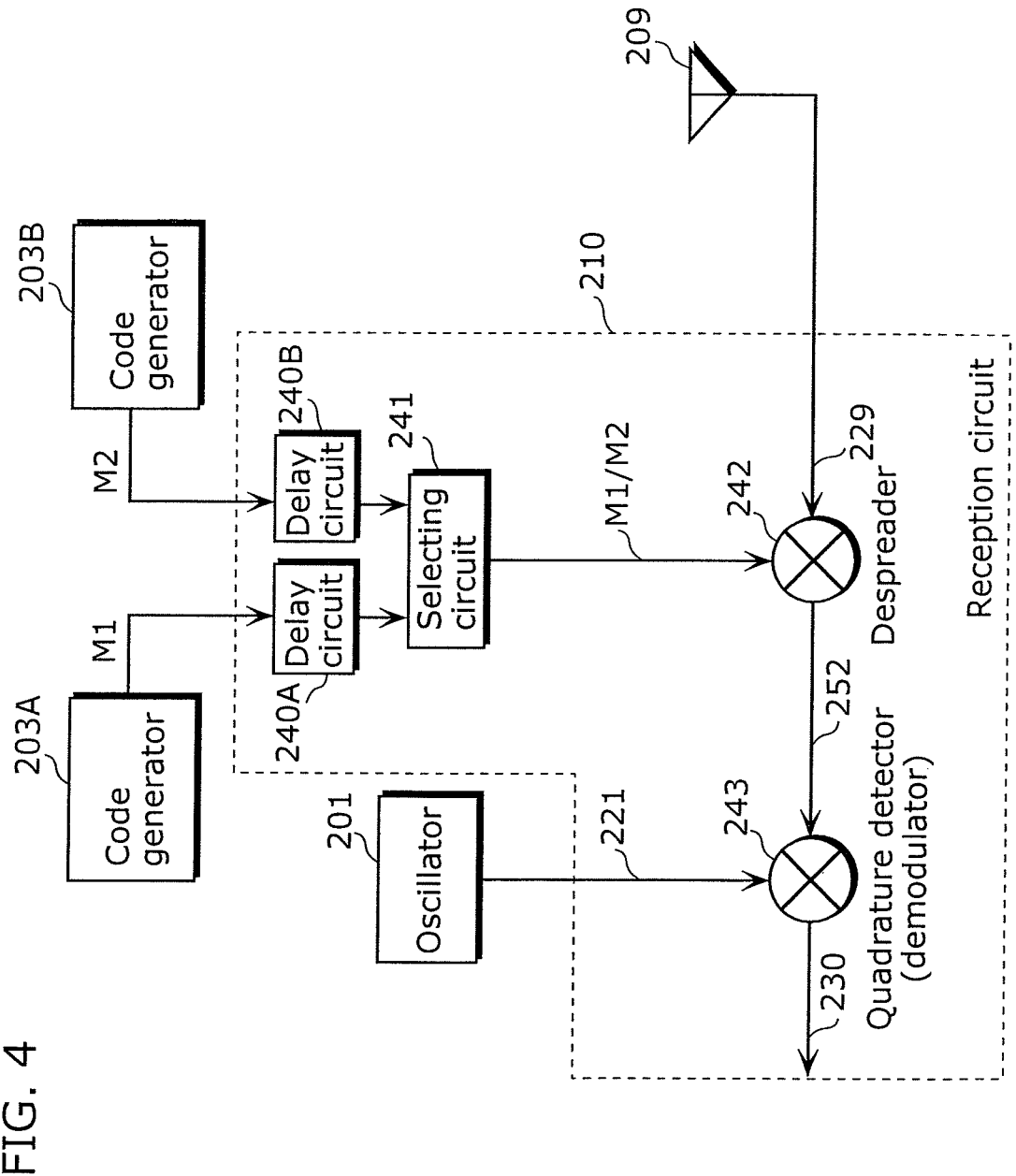
FIG. 4 illustrates a block diagram of a configuration of a reception circuit according to the first embodiment.

FIG. 4 illustrates a block diagram of the configuration of the reception circuit 210. The reception circuit 210 includes delay circuits 240A and 240B, a selecting circuit 241, a despreader 242, and a quadrature detector (demodulator) 243.

The delay circuit 240A delays the code M1, and outputs the delayed code M1. The delay circuit 240B delays the code M2, and outputs the delayed code M2. Since delayed amounts of the codes M1 and M2 in the respective delay circuits 240A and 240B vary, the delay circuits 240A and 240B sequentially output the delayed codes M1 and M2 obtained by increasing or decreasing the amounts. Here, the delayed amounts of the codes M1 and M2 in the delay circuits 240A and 240B correspond to respective distances to an object.

The selecting circuit 241 selects one of the codes M1 and M2 that are delayed by the delay circuits 240A and 240B, respectively.

The received reflected waves 229 are amplified by a low noise amplifier (not illustrated).

After the reception antenna 209 receives the reflected waves 229 using the code M1 or M2 selected by the selecting circuit 241, the despreader 242 despreads the reflected waves 229 amplified by the low noise amplifier, and outputs despread waves 252.

The quadrature detector 243 performs quadrature detection on the despread waves 252 using the carrier waves 221 generated by the oscillator 201, and generates the baseband radar signal 230. Here, quadrature detection is generally performed by vectoring waves using carrier waves having a different phase by 90 degrees, as an in-phase component and a quadrature component.

Next, specific examples of processing in the transmission circuits 204A and 204B, and the reception circuit 210 are described.

Figure 5A:
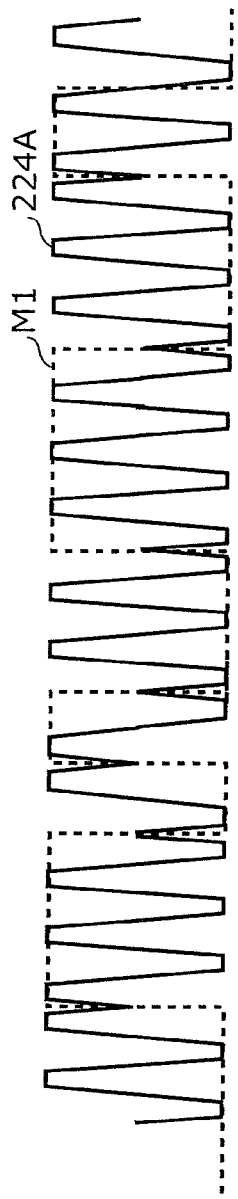
FIG. 5A illustrates an example of a pseudo-random code and spread waves in the radar apparatus according to the first embodiment.

The transmission circuits 204A and 204B spread a spectrum of carrier waves by performing Binary Phase Shift Keying (BPSK) modulation on a pseudo-random code using the carrier waves. FIG. 5A illustrates a relationship between the code M1 and the spread waves 224A. As illustrated in FIG. 5A, the transmission circuit 204A maintains a phase of the carrier waves 222A in a chip corresponding to a logical value "0" of the code M1, and generates the spread waves 224A obtained by inverting the phase of the carrier waves 222A in a chip corresponding to a logical value "1" of the code M1. Here, the chips indicate respective periods of time corresponding to a bit of a pseudo-random code. For example, a 2.5 Gcps code may be used as a chip rate.

Here, the transmission circuit 204B (also) maintains a phase of the carrier waves 222B in a chip corresponding to a logical value "0" of the code M2, and generates the spread waves 224B obtained by inverting the phase of the carrier waves 222B in a chip corresponding to a logical value "1" of the code M2.

Hereinafter, a case where the reception circuit 210 performs despreading and quadrature detection using the code M1 is described.

Figure 5B:
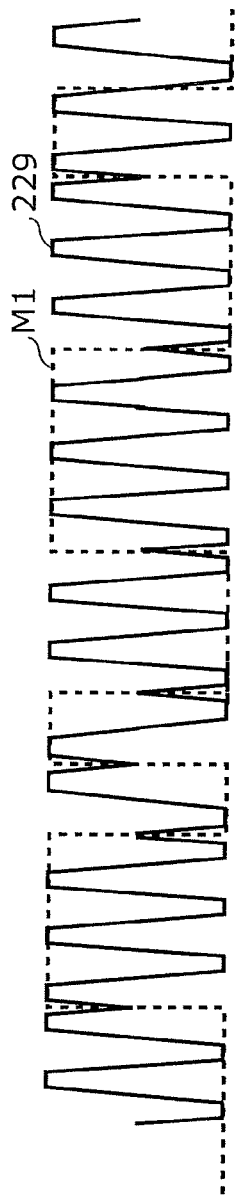
FIG. 5B illustrates an example of a pseudo-random code and reflected waves in the radar apparatus according to the first embodiment.
Figure 5C:
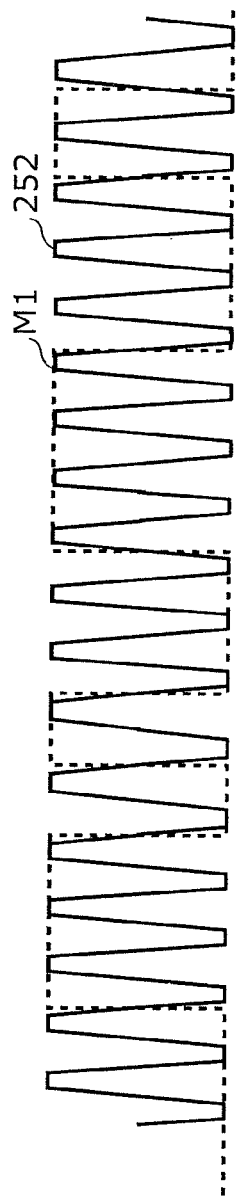
FIG. 5C illustrates an example of a pseudo-random code and despread waves in the radar apparatus according to the first embodiment.
Figure 5D:
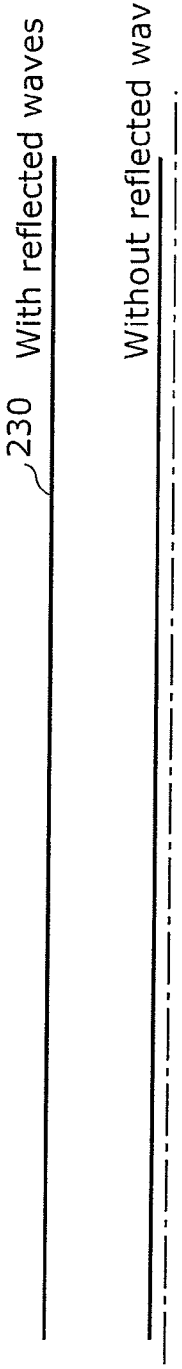
FIG. 5D illustrates an example of a baseband radar signal in the radar apparatus according to the first embodiment.

FIG. 5B illustrates a relationship between the code M1 delayed by the delay circuit 240A and the reflected waves 229. FIG. 5C illustrates a relationship between the code M1 delayed by the delay circuit 240A and the despread waves 252. Here, FIGS. 5B and 5C illustrate examples when an object is present at a distance corresponding to a delayed amount in the delay circuit 240A. FIG. 5D illustrates an example of the baseband radar signal 230.

As illustrated in FIG. 5B, when an object is present within an incident range of the beam 151, the reception antenna 209 receives the reflected waves 229 having the same waveform pattern as that of the spread waves 224A. Furthermore, when an object is present within an incident range of the beam 152, the reception antenna 209 receives the reflected waves 229 having the same waveform pattern as that of the spread waves 224B. Furthermore, when no object is present within the incident ranges of the beams 151 and 152, the reception antenna 209 does not receive the reflected waves 229.

The delay circuit 240A delays the code M1 by changing the delayed amount sequentially. The despreader 242 despreads the reflected waves 229 using the code M1 delayed by the delay circuit 240A.

When an object is present within an incident range of the beam 151, and an amount delayed by the delay circuit 240A corresponds to a distance to the object, as illustrated in FIG. 5C, the despreader 242 generates the despread waves 252 having the same waveform pattern as that of the carrier waves 221. Otherwise, except for the aforementioned cases, the despreader 242 generates the despread waves 252 having a different waveform pattern as that of the carrier waves 221. In other words, the despreader 242 generates the despread waves 252 having a different waveform pattern as that of the carrier waves 221, in the case where: an object is present within the incident range of the beam 152; no object is present within the incident ranges of the beams 151 and 152; or an object is present within the incident range of the beam 151 but an amount delayed by the delay circuit 240A does not correspond to a distance to the object.

Here, the case where a delayed amount corresponds to a distance to an object indicates that the delayed amount in the delay circuit 240A matches a period of time during which the emitted beam 151 is transmitted, reflected from an object, and is received by the reception antenna 209.

Next, the quadrature detector 243 performs quadrature detection on the despread waves 252 using the carrier waves 221.

As illustrated in FIG. 5D, when an object is present within an incident range of the beam 151, and an amount delayed by the delay circuit 240A corresponds to a distance to the object, the quadrature detector 243 outputs a first value indicating that the object is present, as the baseband radar signal 230. This is because the waveform pattern of the despread waves 252 matches that of the carrier waves 221. Otherwise in other cases, since the waveform pattern of the despread waves 252 does not match that of the carrier waves 221, the quadrature detector 243 outputs a second value indicating that no object is present, as the baseband radar signal 230.

More specifically, a maximal value corresponding to an amount delayed by the delay circuit 240A is determined. When the delayed amount reaches the maximal value, the delay circuit 240A initializes the amount to an initial value (for example, 0). Thereby, the reception circuit 210 can repeatedly scan codes within a range from a delayed amount 0 to the maximal delayed amount. The scan repetition time (scan frequency) determines distinctive features of the radar apparatus 200, such as a time resolution (corresponding to a repetition time), a distance resolution (a distance corresponding to a time period corresponding to one delayed amount), and a detectable distance (a maximum detection range).

Furthermore, in the case where an object is present within a maximal detection distance, a value of the baseband radar signal 230 varies according to the presence or absence of the object and a position of the object. In other words, the baseband radar signal 230 is a signal having a bandwidth corresponding to a time period of a distance resolution.

The beam 151 is exemplified in FIGS. 5A to 5D. Since a case using the beam 152 is similar to that of the beam 151 except for the code M2 to be used for the beam 152, the description of the beam 152 is omitted.

Accordingly, the radar apparatus 200 according to the first embodiment of the present invention transmits the spread waves 224A spread by the code M1, and the spread waves 224B spread by the code M2. Furthermore, the radar apparatus 200 despreads and performs quadrature detection on the reflected waves 229 reflected from an object, using the codes M1 and M2, respectively.

Since the codes M1 and M2 have a low correlation, only autocorrelation of the code M1 and the code M2 need to be respectively considered for despreading processing. To put it simply, assume only a case where each of the codes M1 (code in a spread wave and delayed code from a delay circuit) and each of the codes M2 has a uniform phase respectively (autocorrelation function (i) between a code M1 and the delayed code M1 of a received signal and (ii) between a code M2 and the delayed code M2 of a received signal peaks, in other words, has a maximum value). In the case of despreading the reflected waves 229 corresponding to the beam 151 using the code M1, the same waveform as that of the original carrier waves 221 is reconstructed. In contrast, in the case of despreading the reflected waves 229 corresponding to the beam 152 using the code M1, the same waveform as that of the original carrier waves 221 is not reconstructed. Furthermore, in the case of despreading the reflected waves 229 corresponding to the beam 152 using the code M2, the same waveform as that of the original carrier waves 221 is reconstructed. In contrast, in the case of despreading the reflected waves 229 corresponding to the beam 151 using the code M2, the same waveform as that of the original carrier waves 221 is not reconstructed.

In reality, since the waveform of the reflected waves 229 is attenuated or distorted by free space propagation, the waveform obtained by despreading the reflected waves 229 is not exactly the same as that of the original carrier waves 221. Here, a state where a phase is smoothly continuous is referred to as "same as that of the carrier waves 221".

Thereby, the reception circuit 210 can extract the beams 151 and 152 each having a different directional characteristic. In other words, such extraction is equivalent to selection of only an emission pattern from the transmission antenna 205 from among emission patterns emitted from the transmission antennas 205 and 206. Thus, the radar apparatus 200 can switch between detection distances and directions without having a switching device in a transmission path of several tens of GHz.

Here, the radar apparatus 200 includes the selecting circuit 241 that only functions as a circuit that switches between the codes M1 and M2 that are logical values. The selecting circuit 241 may be composed of a simple logical circuit (for example, a 2-input multiplexer or a selector). In other words, the selecting circuit 241 does not affect any carrier waves of several tens of GHz, unlike a switching device for use in a conventional radar apparatus.

Next, disposition of the transmission antennas 205 and 206 and characteristics of the beams 151 and 152 are described.

FIG. 6 schematically illustrates the disposition of the transmission antennas 205 and 206 and emission patterns of the beams 151 and 152.

As illustrated in FIG. 6, the transmission antennas 205 are disposed linearly in a longitudinal direction of FIG. 6. Furthermore, the transmission antennas 205 are disposed at equal intervals illustrated as intervals "d" in FIG. 6. In other words, the transmission antennas 205 are disposed symmetric with respect to a horizontal direction of FIG. 6. Thereby, a symmetric detection range with respect to right and left directions of the vehicle 150 can be achieved.

The transmission antennas 206 are disposed linearly in the longitudinal direction of FIG. 6. Furthermore, the transmission antennas 206 are disposed at equal intervals illustrated as intervals "d" in FIG. 6. In other words, the transmission antennas 206 are disposed symmetric with respect to the horizontal direction of FIG. 6. Thereby, a symmetric detection range with respect to right and left directions of the vehicle 150 can be achieved.

Furthermore, each of the transmission antennas 205 and 206 is an antenna having an identical shape. Furthermore, the transmission antenna 206B is paired with the transmission antenna 205B, and they are disposed closer each other. Furthermore, the transmission antenna 206C is paired with the transmission antenna 205C, and they are disposed closer each other. Furthermore, in the longitudinal direction of FIG. 6, the transmission antennas 205B and 205C respectively paired with the transmission antennas 206B and 206C are sandwiched between the transmission antennas 205A and 205D that are not paired with any of the transmission antennas 206. In other words, the transmission antennas 205B and 205C respectively paired with the transmission antennas 206B and 206C are disposed linearly inward of the transmission antennas 206A and 206D with respect to the longitudinal direction of FIG. 6.

Furthermore, the gain adjustment circuits 207 and 208 set electric field intensity of the beam 152 to be approximately 10 times lower than that of electric field intensity of the beam 151.

In general, as a linear array antenna including the N number of antenna elements disposed at equal intervals "d", where N is an integer of one or more, has larger number of N, a main lobe gets sharper directivity. In contrast, as the linear array antenna has smaller number of N, the main lobe gets broader directivity. Furthermore, as electric field intensity of a beam is higher, the beam is emitted at a longer distance.

The directivity E (θ) of the electric field intensity of the linear array antenna including the N number of antenna elements is expressed by Equation 1 below, where directivity of each of the antenna elements is e (θ), a magnitude of a current to be supplied to each of the antenna elements (element current) is In, and a wave number is kd. For simplification of the equation, a phase of the element current is defined to be 0.

$$|E(\theta)| = \left| e(\theta) \sum_{n=0}^{N-1} I_n \exp(jnkd\sin\theta) \right|$$
$$= e(\theta) I \left| \frac{\sin(Nkd\sin\theta/2)}{\sin(kd\sin\theta/2)} \right|$$ [Equation 1]

Thus, when the electric field intensity of the beam 152 is small enough, the electric field intensity of the beam 151 emitted from the transmission antennas 205 as a linear array antenna including 4 antenna elements is expressed by the directivity E1 (θ) calculated from Equation 2. Here, the element current of each of the transmission antennas 205 is collectively expressed by I1, and the directivity of each of the transmission antennas 205 is collectively expressed by e (θ).

$E1(\theta)=e(\theta)\times I1\times[\exp(j0\ kd\sin\theta)+\exp(j1\ kd\sin\theta)+\exp(j2\ kd\sin\theta)+\exp(j3\ kd\sin\theta)]$ [Equation 2]

In contrast, the electric field intensity of the beam 152 emitted from the transmission antennas 206 as an array antenna including 2 antenna elements is expressed by the directivity E2 (θ) calculated from Equation 3. Here, the element current of each of the transmission antennas 206 is collectively expressed by I2, and the directivity of each of the transmission antennas 206 is collectively expressed by e (θ), where I2<I1.

$E2(\theta)=e(\theta)\times I2\times[\exp(j1\ kd\sin\theta)+\exp(j2\ kd\sin\theta)]$ [Equation 3]

An emission pattern obtained by combining the beams 151 and 152 respectively emitted from the transmission antennas 205 and 206 may be calculated using both Equations 2 and 3. Thus, the emission pattern may be expressed by Equation 4 below.

$E1(\theta)+E2(\theta)=e(\theta)\times[I1\times\exp(j0\ kd\sin\theta)+(I1+I2)*\exp(j1\ kd\sin\theta)+(I1+I2)\times\exp(j2\ kd\sin\theta)+I1\times\exp(j3\ kd\sin\theta)]$ [Equation 4]

As described above, compared to an electric field pattern and electric field intensity of the beam 151 emitted from the transmission antenna 205 and those of the beam 152 emitted from the transmission antenna 206, a main lobe of the beam 151 has sharper directivity and is emitted at a longer distance. In contrast, a main lobe of the beam 152 has broader directivity, and the electric field intensity is smaller. Thus, the beam 152 is emitted at a shorter distance and a broader angle.

As described above, directivities (detection ranges) of the beams 151 and 152 may be optionally designed using above Equations 1 to 4.

Consequently, the radar apparatus 200 according to the first embodiment can emit, forward of the vehicle 150, the beam 151 having a pattern of a longer distance and a narrower angle, and emit, forward and obliquely forward of the vehicle 150, the beam 152 having a pattern of a shorter distance and a broader angle.

Furthermore, the transmission antenna 206B is paired with the transmission antenna 205B, and the transmission antenna 206C is paired with the transmission antenna 205C. The paired transmission antennas are respectively disposed closer each other. Furthermore, the pair of transmission antennas 205B and 206B and the pair of transmission antennas 205C and 206C are sandwiched between the transmission antennas 205A and 205D that are not paired with any of the transmission antennas. Thereby, the transmission antennas 205 and the transmission antennas 206 may be respectively designed as linear array antennas while incident ranges of the beams 151 and 152 are kept symmetric with respect to the right and left directions of the vehicle 150.

The description of the radar apparatus 200 according to the first embodiment above will not limit the scope of the present invention.

For example, although the reception circuit 210 has the configuration illustrated in FIG. 4 in the aforementioned description, the configuration may be one of two configurations described in the following paragraphs.

Figure 7:
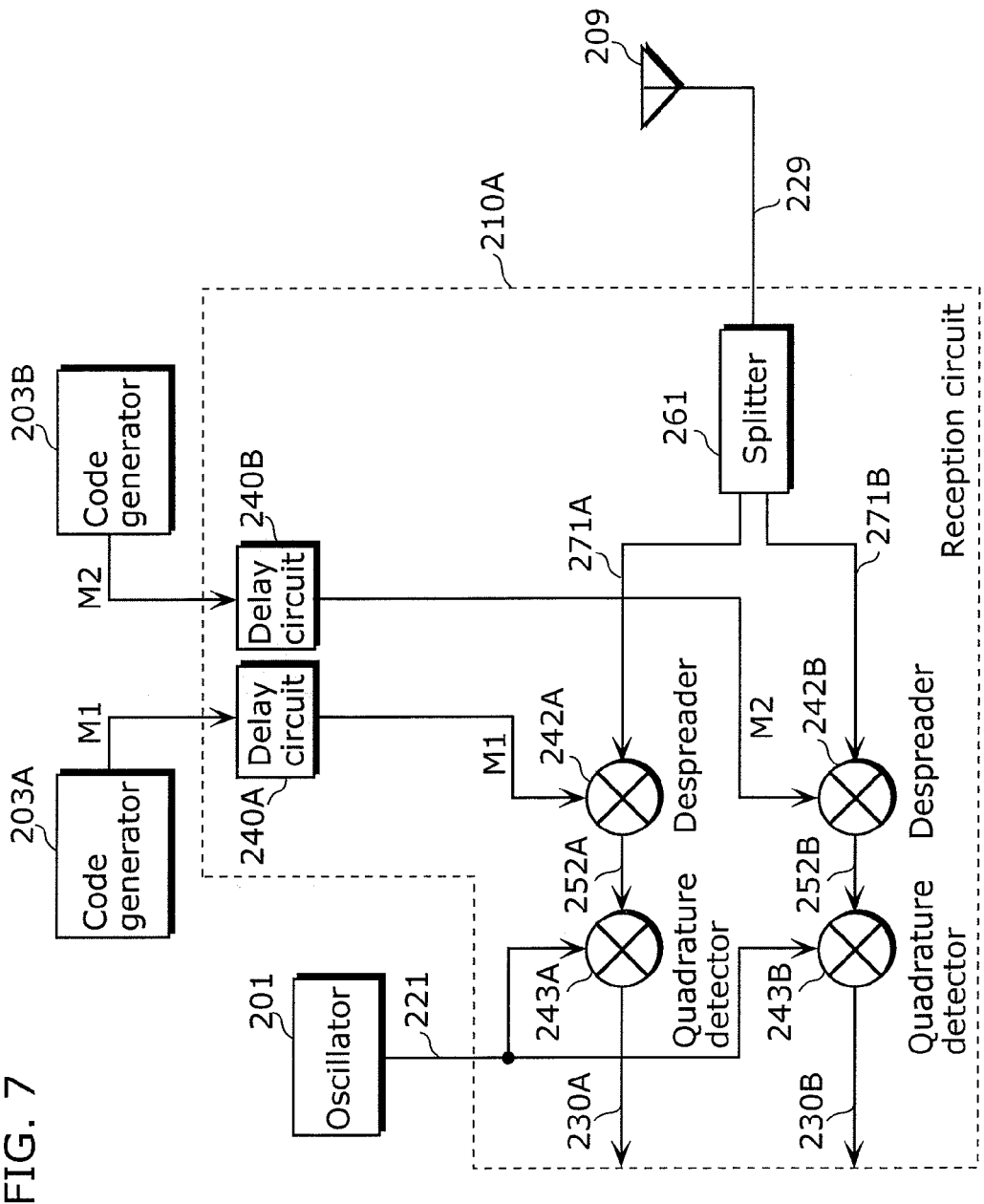
FIG. 7 illustrates a block diagram of a configuration of a variation of a reception circuit according to the first embodiment.

FIG. 7 illustrates a block diagram of the configuration of a reception circuit 210A of the first variation of the reception circuit 210. The constituent elements in FIG. 7 identical to those of FIG. 4 are numbered in the same manner as in FIG. 4, and thus the description is omitted.

The reception circuit 210A in FIG. 7 includes delay circuits 240A and 240B, despreaders 242A and 242B, quadrature detectors 243A and 243B, and a splitter 261.

The splitter 261 splits the reflected waves 229 received by the reception antenna 209 into the same reflected waves 271A and 271B.

The despreader 242A despreads the reflected waves 271A using the code M1 delayed by the delay circuit 240A, and outputs despread waves 252A. The despreader 242B despreads the reflected waves 271B using the code M2 delayed by the delay circuit 240B, and outputs despread waves 252B.

The quadrature detector 243A performs quadrature detection on the despread waves 252A using the carrier waves 221 generated by the oscillator 201, and generates a baseband radar signal 230A. The quadrature detector 243B performs quadrature detection on the despread waves 252B using the carrier waves 221 generated by the oscillator 201, and generates a baseband radar signal 230B. The signal processing circuit 211 decides a distance from the vehicle 150 to an object, and a relative speed with respect to the object by performing signal processing on the baseband radar signals 230A and 230B.

As such, the reception circuit 210A can perform both despreading and quadrature detection on reflected waves in parallel using the codes M1 and M2. Thus, the processing speed of the reception circuit 210A can be improved. Furthermore, the signal processing circuit 211 can perform signal processing on the baseband radar signals 230A and 230B in parallel. Thus, the processing speed of the radar apparatus 200 can be improved.

Figure 8:
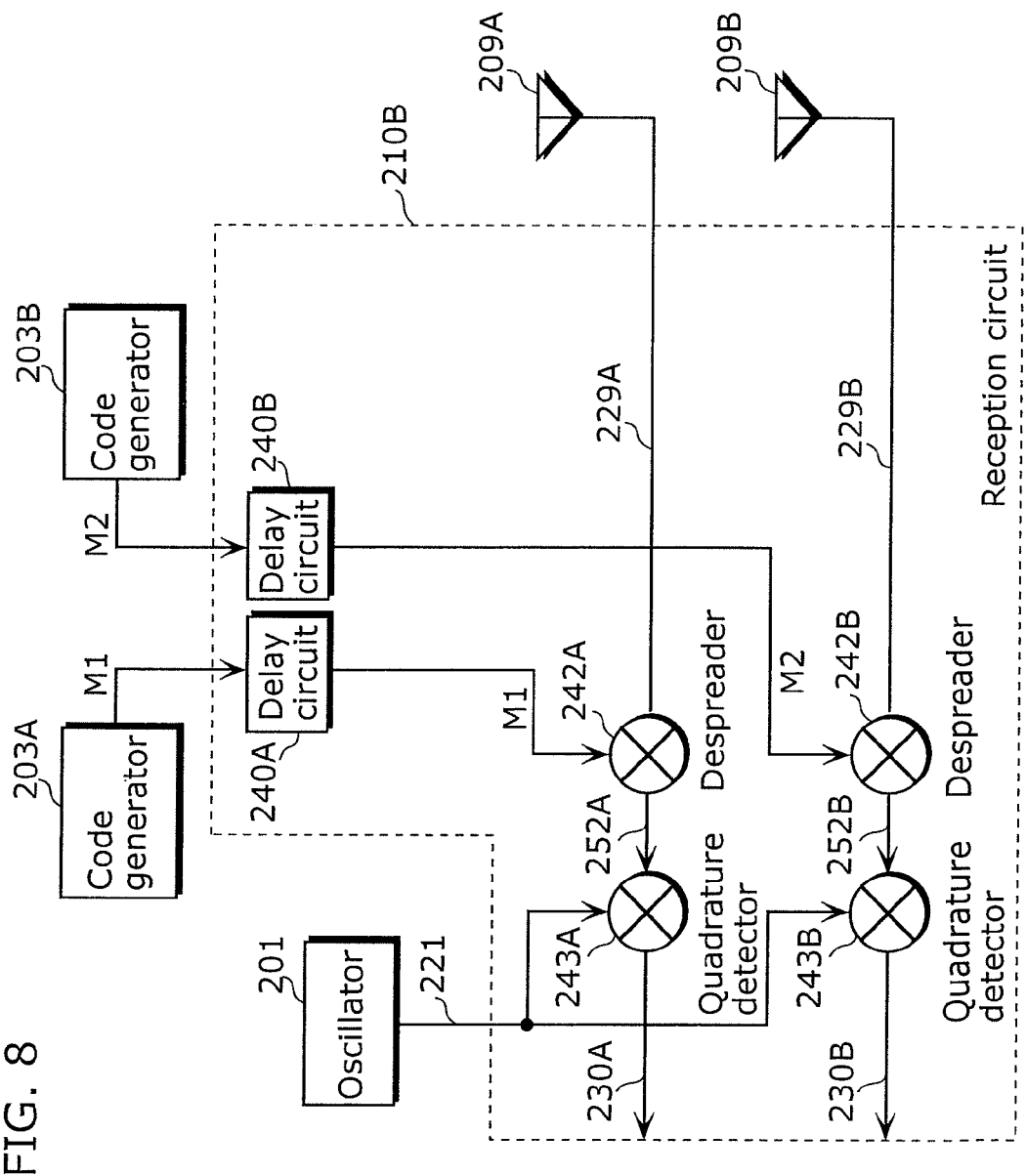
FIG. 8 illustrates a block diagram of a configuration of a variation of a reception circuit according to the first embodiment.

FIG. 8 illustrates a block diagram of the configuration of a reception circuit 210B of the second variation of the reception circuit 210. The constituent elements in FIG. 8 identical to those of FIG. 7 are numbered in the same manner as in FIG. 7, and thus the description is omitted.

The reception circuit 210B in FIG. 8 is different from the reception circuit 210A in excluding the splitter 261. Furthermore, as illustrated in FIG. 8, the radar apparatus 200 includes two reception antennas 209A and 209B.

The reception antenna 209A receives reflected waves 229A obtained by reflection from objects with the beams 151 and 152 that have been respectively transmitted by the transmission antennas 205 and 206. The reception antenna 209B receives reflected waves 229B obtained by reflection from objects with the beams 151 and 152 that have been respectively transmitted by the transmission antennas 205 and 206. In other words, the reflected waves 229A and 229B are reflected waves of the same waveform pattern.

The despreader 242A despreads the reflected waves 229A using the code M1 delayed by the delay circuit 240A, and outputs the despread waves 252A. The despreader 242B despreads the reflected waves 229B using the code M2 delayed by the delay circuit 240B, and outputs the despread waves 252B.

As such, the reception circuit 210B can perform both despreading and quadrature detection on waves in parallel using the codes M1 and M2. Thus, the processing speed of the reception circuit 210B can be improved. Furthermore, the signal processing circuit 211 can perform signal processing on the baseband radar signals 230A and 230B in parallel. Thus, the processing speed of the radar apparatus 200 can be improved.

Although the radar apparatus 200 is installed in a front side of the vehicle 150 in the aforementioned description, the radar apparatus 200 may be installed in a rear side or a lateral side of the vehicle 150. Furthermore, the radar apparatus 200 may be installed in 2 or more portions from among the front side, rear side, and lateral side of the vehicle 150.

Furthermore, although the radar apparatus 200 switches between 2 patterns of detection ranges in the aforementioned description, the radar apparatus 200 may switch between 3 or more patterns of detection ranges.

Furthermore, although the transmission antennas 205 and 206 have the identical shape in the aforementioned description, they may have different shapes.

Furthermore, although the gain adjustment circuit 207 amplifies the spread waves 224A and the gain adjustment circuit 208 attenuates the spread waves 224B in the aforementioned description, the gain adjustment circuits 207 and 208 may amplify the spread waves 224A or attenuate the spread waves 224B. In this case, the radar apparatus 200 may exclude the gain adjustment circuit 207 or 208 that does not adjust a gain.

Second Embodiment

The first embodiment describes examples of spreading and despreading of waves using different M-sequence codes. In contrast, the second embodiment describes a radar apparatus that spreads and despreads waves using different gold codes.

Figure 9:
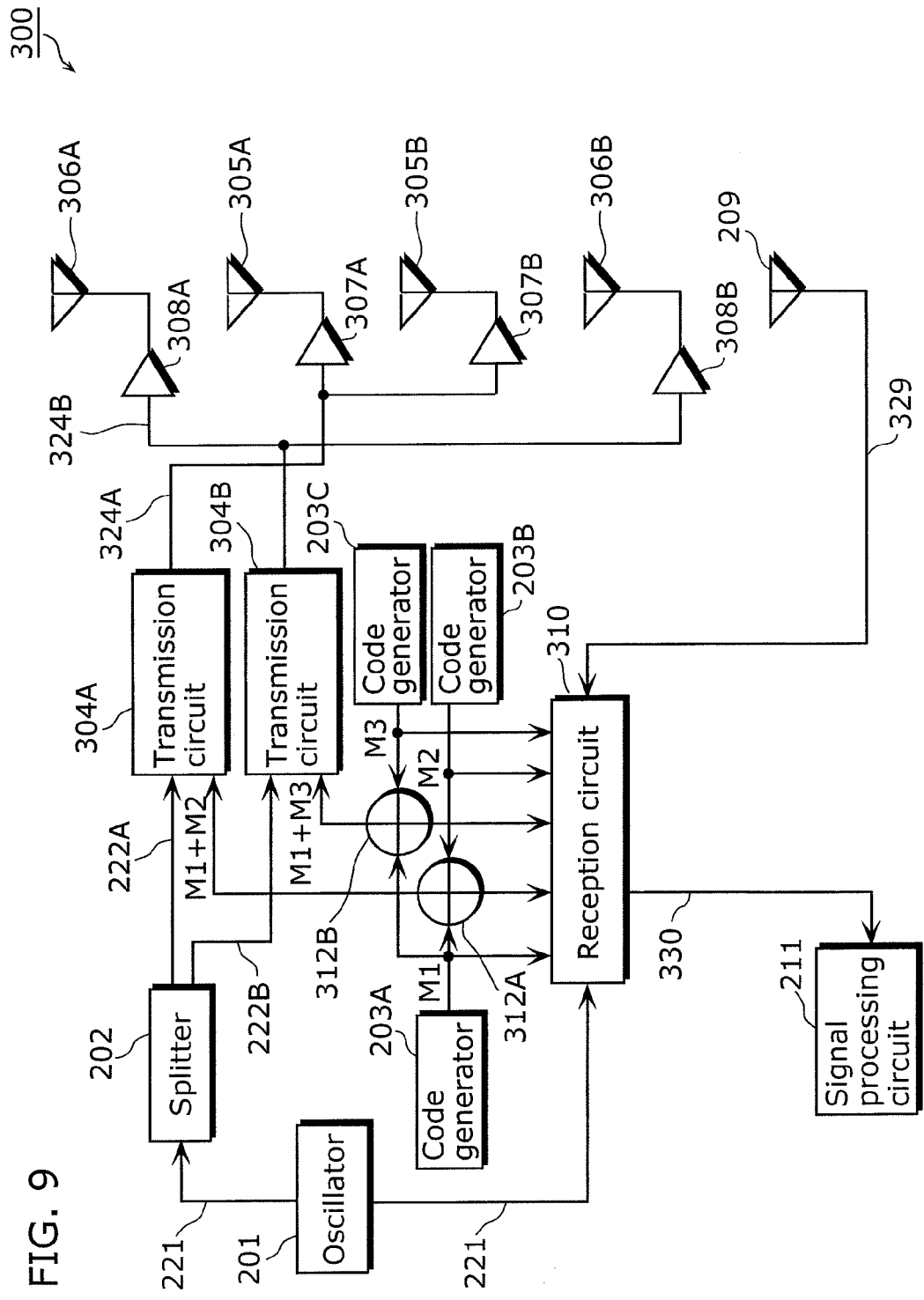
FIG. 9 illustrates a block diagram of a configuration of a radar apparatus according to the second embodiment.

FIG. 9 illustrates a block diagram of a configuration of a radar apparatus 300 according to the second embodiment. The constituent elements in FIG. 9 identical to those of FIG. 3 are numbered in the same manner as in FIG. 3, and thus the description is omitted.

The radar apparatus 300 is different from the radar apparatus 200 of the first embodiment in use of gold codes and disposition of transmission antennas.

The radar apparatus 300 includes an oscillator 201, a splitter 202, code generators 203A, 203B, and 203C, OR circuits 312A and 312B, transmission circuits 304A and 304B, transmission antennas 305A, 305B, 306A, and 306B, gain adjustment circuits 307A, 307B, 308A, and 308B, a reception antenna 209, a reception circuit 310, and a signal processing circuit 211. When antennas do not have to be distinguished from each other, the transmission antennas 305A and 305B are collectively referred to as a transmission antenna 305. Alternatively, the transmission antennas 306A and 306B are collectively referred to as a transmission antenna 306. When circuits do not have to be distinguished from each other, the gain adjustment circuits 307A and 307B are collectively referred to as a gain adjustment circuit 307. Alternatively, the gain adjustment circuits 308A and 308B are collectively referred to as a gain adjustment circuit 308.

The code generator 203C generates a pseudo-random code M3 (hereinafter referred to as a "code M3"). The codes M1, M2, and M3 are different pseudo-random codes. In the second embodiment, the codes M1, M2, and M3 are PN codes each having a different pattern, and more specifically, are different M-sequence codes. Furthermore, the codes M1, M2, and M3 are preferably M-sequence codes having a low correlation therebetween.

The OR circuit 312A generates a gold code (M1+M2) obtained through an exclusive OR of the codes M1 and M2. The OR circuit 312B generates a gold code (M1+M3) obtained through an exclusive OR of the codes M1 and M3.

The transmission circuit 304A spreads the carrier waves 222A using the gold code (M1+M2), and generates spread waves 324A. The transmission circuit 304B spreads the carrier waves 222B using the gold code (M1+M3), and generates spread waves 324B.

The gain adjustment circuit 307 amplifies the spread waves 324A. The gain adjustment circuit 308 attenuates the spread waves 324B. More specifically, the gain adjustment circuits 307 and 308 set electric field intensity of the spread waves 324A to be transmitted from the transmission antenna 305 to approximately 10 times higher than that of the spread waves 324B to be transmitted from the transmission antenna 306.

The transmission antenna 305 emits a beam 153 by transmitting the spread waves 324A amplified by the gain adjustment circuit 307. The transmission antenna 306A emits a beam 154A by transmitting the spread waves 324B attenuated by the gain adjustment circuit 308. The transmission antenna 306B emits a beam 154B by transmitting the spread waves 324B attenuated by the gain adjustment circuit 308. Furthermore, the beams 153, 154A, and 154B to be emitted have different directional characteristics of carrier waves. More specifically, the beam 153 is emitted at a longer distance and at a narrower angle than those of the beams 154A and 154B.

The reception antenna 209 receives reflected waves 329 obtained by reflection from objects with the beams 153, 154A, and 154B that have been respectively transmitted by the transmission antennas 305, 306A, and 306B.

Furthermore, the reception circuit 310 despreads the reflected waves 329 using the code (M1+M2), and performs quadrature detection (demodulation) on the despread signal to generate a baseband radar signal 330. In other words, the reception circuit 310 extracts reflected waves obtained by reflection from objects with the beam 153, and generates the baseband radar signal 330 corresponding to the reflected waves. Furthermore, the reception circuit 310 despreads the reflected waves 329 using the code (M1+M3), and performs quadrature detection (demodulation) on the despread signal to generate the baseband radar signal 330. In other words, the reception circuit 310 extracts reflected waves obtained by reflection from objects with the beams 154A and 154B, and generates the baseband radar signal 330 corresponding to the reflected waves.

Figure 10:
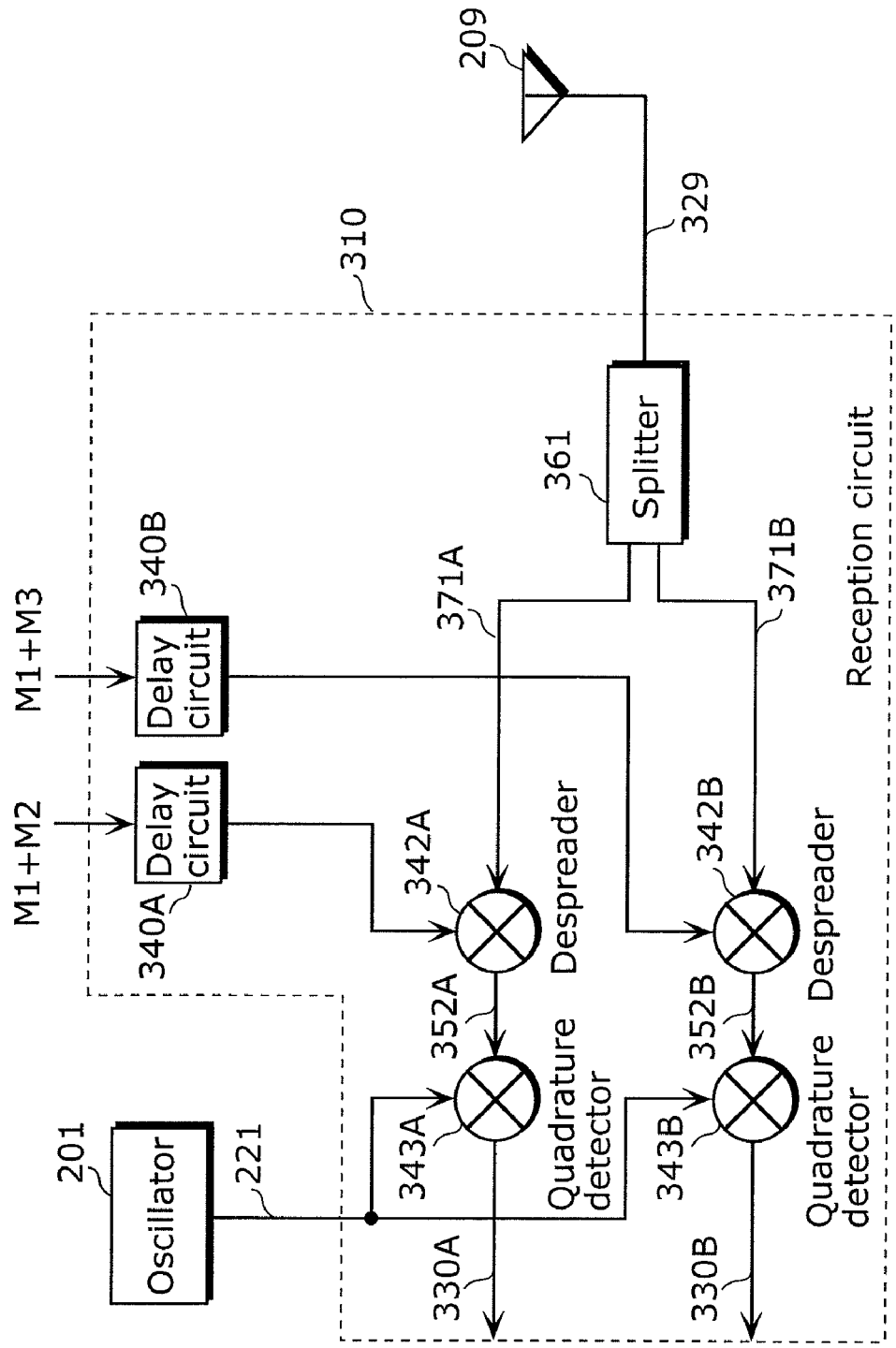
FIG. 10 illustrates a block diagram of a configuration of a reception circuit according to the second embodiment.

FIG. 10 illustrates a block diagram of a configuration of the reception circuit 310.

The reception circuit 310 in FIG. 10 includes delay circuits 340A and 340B, despreaders 342A and 342B, quadrature detectors 343A and 343B, and a splitter 361.

The delay circuit 340A delays the gold code (M1+M2), and outputs the delayed code (M1+M2). The delay circuit 340B delays the gold code (M1+M3), and outputs the delayed code (M1+M3). Since delayed amounts of the codes in the respective delay circuits 340A and 340B vary, the delay circuits 340A and 340B output the codes (M1+M2) and (M1+M3) obtained by increasing or decreasing the delayed amounts sequentially. Here, the delayed amounts of the codes M1, M2, and M3 in the delay circuits 340A and 340B correspond to respective distances to an object.

The splitter 361 splits the reflected waves 329 received by the reception antenna 209 into the same reflected waves 371A and 371B.

The despreader 342A despreads the reflected waves 371A using the code (M1+M2) delayed by the delay circuit 340A, and outputs despread waves 352A. The despreader 342B despreads the reflected waves 371B using the code (M1+M3) delayed by the delay circuit 340B, and outputs despread waves 352B.

The quadrature detector 343A performs quadrature detection on the despread waves 352A using the carrier waves 221 generated by the oscillator 201, and generates a baseband radar signal 330A. The quadrature detector 343B performs quadrature detection on the despread waves 352B using the carrier waves 221 generated by the oscillator 201, and generates a baseband radar signal 330B. The signal processing circuit 211 detects a distance from the vehicle 150 to an object, and a relative speed with respect to the object by performing signal processing on the baseband radar signals 330A and 330B.

With the aforementioned configuration, the radar apparatus 300 according to the second embodiment can have the same advantages as those of the radar apparatus 200 according to the first embodiment.

Furthermore, the radar apparatus 300 spreads and despreads waves using gold-sequence pseudo-random codes. Thus, even when the number of beams to be emitted increases, the radar apparatus 300 can generate various pseudo-random codes easily and use the codes for spreading and despreading waves.

Furthermore, the reception circuit 310 can perform both despreading and quadrature detection on waves in parallel using the codes (M1+M2) and (M1+M3). Thus, the processing speed of the reception circuit 310 can be improved. Furthermore, the signal processing circuit 211 can perform signal processing on the baseband radar signals 330A and 330B in parallel. Thus, the processing speed of the radar apparatus 300 can be improved.

Here, the reception circuit 310 may include the selecting circuit 241 as illustrated in FIG. 4. Furthermore, as illustrated in FIG. 8, the radar apparatus 300 may include two reception antennas 209A and 209B without the splitter 361.

Next, disposition of the transmission antennas 305 and 306 and characteristics of the beams 153, 154A, and 154B are described.

Figure 11:
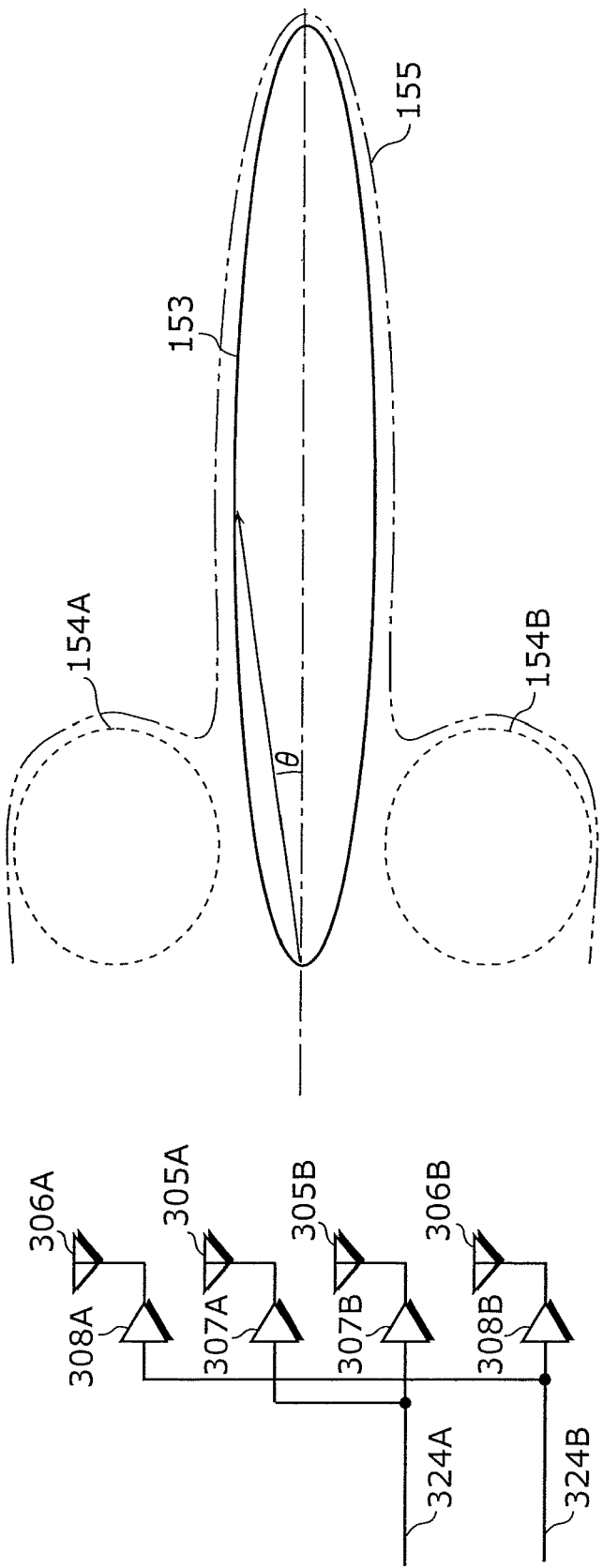
FIG. 11 schematically illustrates disposition of transmission antennas and emission patterns of beams according to the second embodiment.

FIG. 11 schematically illustrates disposition of the transmission antennas 305 and 306 and emission patterns of the beams 153, 154A, and 154B.

As illustrated in FIG. 11, the transmission antennas 305 and 306 are disposed linearly in a longitudinal direction. Furthermore, the transmission antennas 305 and 306 are disposed symmetric with respect to a lateral direction of FIG. 11.

The transmission antenna 305 functions as an array antenna including 2 antenna elements. The transmission antennas 306A and 306B function each as an antenna including a single antenna element.

Figure 12:
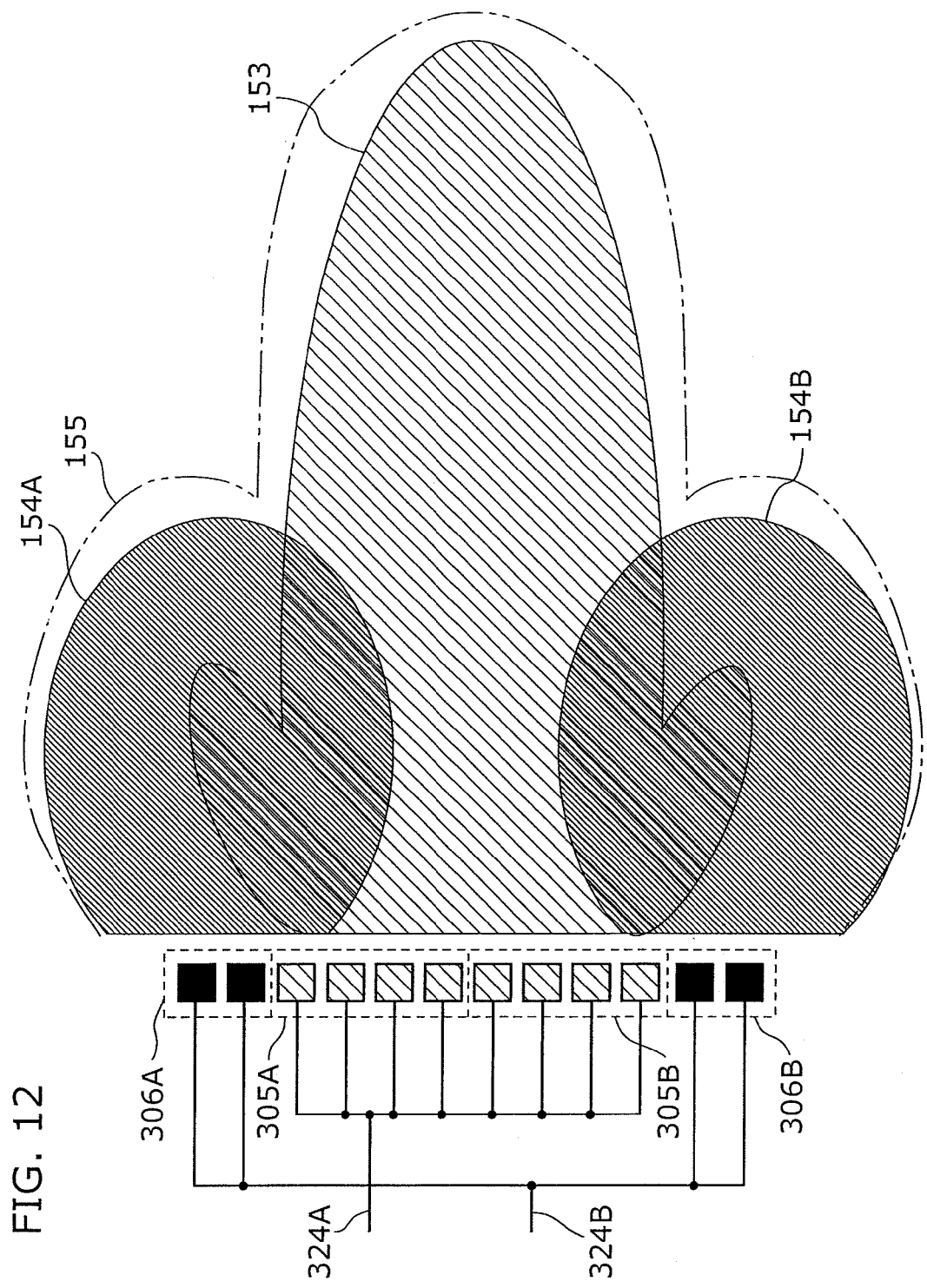
FIG. 12 illustrates a configuration of transmission antennas according to the second embodiment.

FIG. 12 illustrates a configuration of the transmission antennas 305 and 306. As illustrated in FIG. 12, the transmission antennas 305A and 305B are linear array antennas including 4 antenna elements, respectively. The transmission antennas 306A and 306B are linear array antennas including 2 antenna elements, respectively. The antenna elements included in each of the transmission antennas 305A, 305B, 306A, and 306B are disposed linearly.

The transmission antenna 305 emits the beam 153 having a pattern of a longer distance and a narrower angle forward of the vehicle 150. The transmission antenna 306A emits the beam 154A having a pattern of a shorter distance and a broader angle diagonally forward left of the vehicle 150. The transmission antenna 306B emits the beam 154B having a pattern of a shorter distance and a broader angle diagonally forward right of the vehicle 150. The beam 155 illustrated in FIGS. 11 and 12 is a beam obtained by combining the beams 153, 154A, and 154B.

Consequently, the radar apparatus 300 according to the second embodiment can emit: the beam 153 having a pattern of a longer distance and a narrower angle, forward of the vehicle 150; the beam 154A having a pattern of a shorter distance and a broader angle, diagonally forward left of the vehicle 150; and the beam 154B having a pattern of a shorter distance and a broader angle, diagonally forward right of the vehicle 150.

Furthermore, a reception circuit described as following may be used instead of the reception circuit 310.

Figure 13:
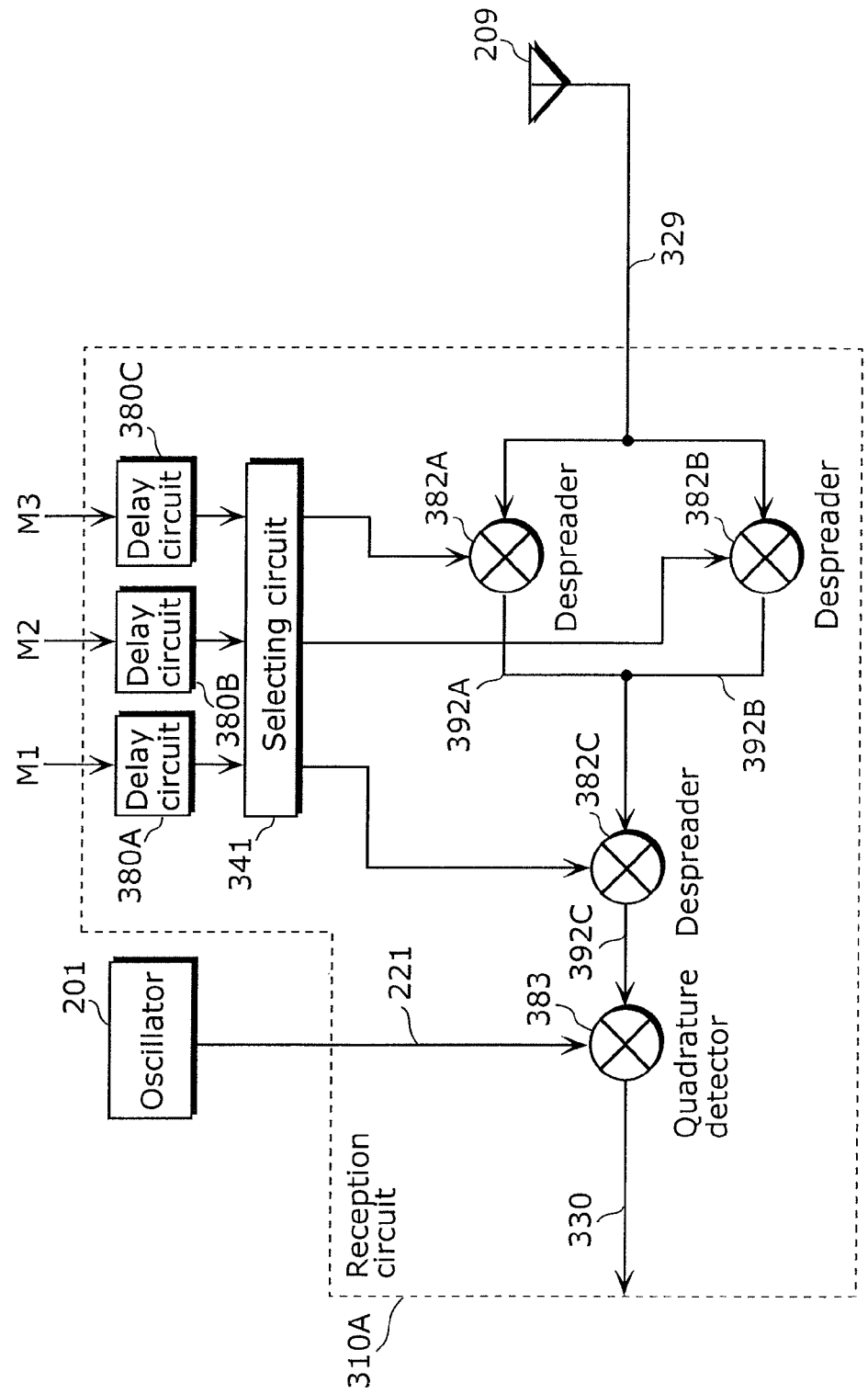
FIG. 13 illustrates a block diagram of a configuration of a variation of a reception circuit according to the second embodiment.

FIG. 13 illustrates a block diagram of a configuration of a reception circuit 310A as a variation of the reception circuit 310. The constituent elements in FIG. 13 identical to that of FIG. 10 are numbered in the same manner as in FIG. 10, and thus the description is omitted.

The reception circuit 310A illustrated in FIG. 13 can extract spread waves spread by gold codes (M1+M2), (M1+M3), and (M2+M3) in combination of any codes of M1, M2, and M3.

The reception circuit 310A includes delay circuits 380A, 380B, and 380C, a selecting circuit 341, despreaders 382A, 382B, and 382C, and a quadrature detector 383.

The delay circuit 380A delays the code M1, and outputs the delayed code M1. The delay circuit 380B delays the code M2, and outputs the delayed code M2. The delay circuit 380C delays the code M3, and outputs the delayed code M3. Since delayed amounts of the codes M1, M2, and M3 in the respective delay circuits 380A, 380B, and 380C vary, the delay circuits 380A, 380B, and 380C output the codes M1, M2 and M3 obtained by increasing or decreasing the amounts sequentially.

The selecting circuit 341 supplies the codes M1, M2, and M3 to the despreaders 382A, 382B, and 382C. In other words, the selecting circuit 341 assigns the different codes M1, M2, and M3 to the despreaders 382A, 382B, and 382C.

The despreader 382A despreads the reflected waves 329 using one of the codes M1, M2, and M3 assigned by the selecting circuit 341, and outputs despread waves 392A.

The despreader 382B despreads the reflected waves 329 using one of the codes M1, M2, and M3 assigned by the selecting circuit 341, and outputs despread waves 392B.

The despreader 382C despreads the reflected waves 329A and 392B using one of the codes M1, M2, and M3 assigned by the selecting circuit 341.

Next, operations of the reception circuit 310A are described. As an example, an operation of the reception circuit 310A when spread waves spread by the gold codes (M1+M2) and (M1+M3) are extracted is described.

For example, the selecting circuit 341 supplies the code M2 to the despreader 382A, the code M3 to the despreader 382B, and the code M1 to the despreader 382C.

The despreader 382A despreads the reflected waves 329 using the code M2, and outputs the despread waves 392A. The despreader 382B despreads the reflected waves 329 using the code M3, and outputs the despread waves 392B.

The despreader 382C despreads the reflected waves 329A and 392B using the code M1, and outputs despread waves 392C.

As such, the reflected waves 329 are despread by the despreaders 382A and 382C, using the codes M1 and M2. This operation is the same as despreading using the gold code (M1+M2). In the same manner, the reflected waves 329 are despread by the despreaders 382B and 382C, using the codes M1 and M3. This operation is the same as despreading using the gold code (M1+M3). Thus, when an object is present within detection ranges of the beams 153, 154A, and 154B, the despread waves 392C corresponds to a pattern of the carrier waves 221. In other words, the reception circuit 310A can extract spread waves spread by the gold codes (M1+M2) and (M1+M3).

Here, the despreaders 382A and 382C, and the despreaders 382B and 382C despread reflected waves for a sufficiently short period of time with respect to one chip period (inverse of chip rate). Here, one chip period is a period corresponding to one bit of a pseudo-random code. For example, one chip period is approximately 1/10 of a cycle of carrier waves.

Furthermore, when the selecting circuit 341 changes codes assigned to the despreaders 382A, 382B, and 382C, the reception circuit 310A can extract the reflected waves 329 spread by gold codes determined in combination of any two codes. Thus, the reception circuit 310A can extract only reflected waves 329 spread by such gold codes selected from among different gold codes used for spreading reflected waves 329. For example, codes assigned to the despreaders 382A, 382B, and 382C are defined to be M2, M3, and M1, respectively, and thus the reception circuit 310A can extract other than the reflected waves spread by the gold code (M2+M3) when beams spread by the codes (M1+M2), (M1+M3), and (M2+M3) are simultaneously emitted and the reception antenna 209 receives the reflected waves.

Furthermore, although the radar apparatus 300 switches between 2 patterns of detection ranges in the aforementioned description, the radar apparatus 300 may switch between 3 or more patterns of detection ranges. When switching between 3 or more patterns of detection ranges, the radar apparatus 300 may include an OR circuit and use a gold code (M2+M3).

Furthermore, although the transmission antenna 305 is an linear array antenna including 4 antenna elements and the transmission antenna 306 is an linear array antenna including 2 antenna elements in the aforementioned description, the transmission antennas 305 and 306 have only to include at least one antenna element. For example, the transmission antennas 305 and 306 may be linear array antennas including the same number of antenna elements.

Furthermore, although the gain adjustment circuit 307 amplifies the spread waves 324A and the gain adjustment circuit 308 attenuates the spread waves 324B in the aforementioned description, the gain adjustment circuits 307 and 308 may amplify the spread waves 324A or attenuate the spread waves 324B. In this case, the radar apparatus 300 may exclude the gain adjustment circuit 307 or 308 that does not adjust a gain.

Furthermore, although the radar apparatus 300 includes the transmission antennas 305 and 306 disposed as illustrated in FIG. 11, it may include the transmission antennas disposed as illustrated in FIG. 6. Furthermore, the radar apparatus 200 according to the first embodiment may include the transmission antenna disposed as illustrated in FIG. 11.

Furthermore, as illustrated in FIG. 6, the radar apparatus 300 may include the transmission antennas 305 that are larger than the transmission antennas 306 in number, and the transmission antennas 306 may be paired with some of the transmission antennas 305 and be closely disposed each other. More specifically, the other transmission antennas 305 that are not paired with the transmission antennas 306 may be sandwiched between the pairs of transmission antennas 305 and 306 in a longitudinal direction.

Furthermore, the transmission antennas 205, 206, 305, and 306 may be designed and have the configuration including the number of the antennas and the disposition so as to have necessary emission patterns of beams, regardless of configurations of the linear array antennas described in the first and second embodiments. For example, the transmission antennas 205, 206, 305, and 306 are not limited to array antennas but may be antennas each including a single antenna element. Furthermore, the number of the transmission antennas 205, 206, 305, and 306 may be increased.

Furthermore, although in the aforementioned description, the gain adjustment circuits 207 and 307 amplify the spread waves 224A and 324A, respectively, and the gain adjustment circuits 208 and 308 attenuate the spread waves 224B and 324B, respectively, the gain adjustment circuits 207, 208, 307, and 308 may be anything as long as they adjust a gain of a beam emitted from the transmission antennas 205 and 305 to be larger than a gain of the beam emitted from the transmission antennas 206 and 306. For example, the carrier waves 222A and 222B may be amplified or attenuated by providing the gain adjustment circuits 207, 208, 307, and 308 in a front stage of the transmission circuits 204A, 204B, 304A, and 304B.

Furthermore, the radar apparatuses 200 and 300 may adjust a gain of a beam emitted from the transmission antennas 205 and 305 to be larger than a gain of a beam emitted from the transmission antennas 206 and 306 by excluding the gain adjustment circuits 207, 208, 307, and 308, and changing the configurations of the transmission antennas 205, 206, 305, and 306.

Furthermore, although the reception circuits 210, 210A, 210B, 310, and 310A include the quadrature detectors 243, 243A, 243B, 343A, 343B, and 383 that perform detection using a quadrature component, the reception circuits 210, 210A, 210B, 310, and 310A may include a synchronous detector that performs detection using an in-phase component instead of the quadrature detectors 243, 243A, 243B, 343A, 343B, and 383.

Furthermore, although the radar apparatuses 200 and 300 perform homodyne detection (direct conversion) using the carrier waves 221 generated by the oscillator 201 in the aforementioned description, the present invention may be applicable to a radar apparatus that performs heterodyne detection using other frequencies at a reception side.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention may be applicable to a radar apparatus, in particular to an on-vehicle radar apparatus that detects an obstacle and other objects.

What is claimed is:

1. A radar apparatus that detects an object, comprising:
   an oscillator configured to generate carrier waves;
   a first transmitter configured to spread the carrier waves generated by said oscillator using a first pseudo-random code;
   a second transmitter configured to spread the carrier waves generated by said oscillator using a second pseudo-random code different from the first pseudo-random code;
   a first transmission antenna configured to transmit first carrier waves that are the carrier waves spread by said first transmitter;
   a second transmission antenna configured to transmit second carrier waves that are the carrier waves spread by said second transmitter, the second carrier waves having a directional characteristic different from a directional characteristic of the first carrier waves transmitted by said first transmission antenna;
   a reception antenna that includes a first reception antenna configured to receive reflected waves that are the first carrier waves transmitted by said first transmission antenna and reflected from the object and a second reception antenna configured to receive reflected waves that are the second carrier waves transmitted by said second transmission antenna and reflected from the object; and
   a receiver that includes a first despreader configured to despread the reflected waves received by said first reception antenna using the first pseudo-random code, a first detector configured to detect the reflected waves despread by said first despreader using the carrier waves generated by said oscillator, a second despreader configured to despread the reflected waves received by said second reception antenna using the second pseudo-random code, and a second detector configured to detect the reflected waves despread by said second despreader using the carrier waves generated by said oscillator.

2. The radar apparatus according to claim 1, wherein the first carrier waves transmitted by said first transmission antenna cover a range of a longer distance and a narrower angle than a range of the second carrier waves transmitted by said second transmission antenna.

3. The radar apparatus according to claim 1, wherein said first transmission antenna includes third transmission antennas,
   said second transmission antenna includes fourth transmission antennas that are less in number than said third transmission antennas,
   said third transmission antennas and said fourth transmission antennas are respectively disposed linearly in a first direction, and
   said third transmission antennas and said fourth transmission antennas are respectively disposed symmetric with respect to a second direction perpendicular to the first direction.

4. The radar apparatus according to claim 3, wherein each of said fourth transmission antennas is disposed to be paired with one of said third transmission antennas, and in the first direction, one of pairs of said third transmission antennas and said fourth transmission antennas are sandwiched between other of said third transmission antennas that are not paired with said fourth transmission antennas and said third transmission antennas that are not paired with said fourth transmission antennas are sandwiched between the pairs of said third transmission antennas and said fourth transmission antennas and the other of said third transmission antennas.

5. The radar apparatus according to claim 1, further comprising:
   a gain adjuster configured to adjust a gain of the first carrier waves transmitted by said first transmission antenna to be larger than a gain of the second carrier waves transmitted by said second transmission antenna.

6. The radar apparatus according to claim 1, further comprising:
   a code generator configured to generate a third pseudo-random code, a fourth pseudo-random code, and a fifth pseudo-random code;
   a first OR circuit configured to generate the first pseudo-random code by calculating an exclusive OR of the third pseudo-random code and the fourth pseudo-random code; and
   a second OR circuit configured to generate the second pseudo-random code by calculating an exclusive OR of the third pseudo-random code and the fifth pseudo-random code.

7. A radar apparatus that detects an object, said radar apparatus, comprising:
   an oscillator configured to generate carrier waves;
   a first transmitter configured to spread the carrier waves generated by said oscillator using a first pseudo-random code;
   a second transmitter configured to spread the carrier waves generated by said oscillator using a second pseudo-random code different from the first pseudo-random code;
   a code generator configured to generate a third pseudo-random code, a fourth pseudo-random code, and a fifth pseudo-random code;
   a first OR circuit configured to generate the first pseudo-random code by calculating an exclusive OR of the third pseudo-random code and the fourth pseudo-random code;
   a second OR circuit configured to generate the second pseudo-random code by calculating an exclusive OR of the third pseudo-random code and the fifth pseudo-random code;
   a first transmission antenna configured to transmit first carrier waves that are the carrier waves spread by said first transmitter;
   a second transmission antenna configured to transmit second carrier waves that are the carrier waves spread by said second transmitter, the second carrier waves having a directional characteristic being different from a directional characteristic of the first carrier waves transmitted by said first transmission antenna;
   a reception antenna configured to receive reflected waves that are the first carrier waves and the second carrier waves that have been transmitted respectively by said first transmission antenna and said second transmission antenna and that have been reflected from the object;
   a receiver that includes a first despreader, a second despreader, a third despreader, and a selector,
   wherein the selector is configured to assign the third pseudo-random code, the fourth pseudo-random code, and the fifth pseudo-random code to said first despreader, said second despreader, and said third despreader, said first despreader is configured to despread the reflected waves received by said reception antenna using one of the third pseudo-random code, the fourth pseudo random code, and the fifth pseudo-random code assigned by said selector, said second despreader is configured to despread the reflected waves received by said reception antenna using one of the third pseudo-random code, the fourth pseudo-random code, and the fifth pseudo-random code assigned by said selector, said third despreader is configured to despread the reflected waves despread by said first despreader and the reflected waves despread by said second despreader using one of the third pseudo-random code, the fourth pseudo-random code, and the fifth pseudo-random code assigned by said selector, and said receiver includes a detector configured to detect the reflected waves despread by said third despreader, using the carrier waves generated by said oscillator.

* * * * *